(12) United States Patent
Ferreol et al.

(10) Patent No.: US 7,453,399 B2
(45) Date of Patent: Nov. 18, 2008

(54) ANTENNA PROCESSING METHOD FOR POTENTIALLY NON-CENTERED CYCLOSTATIONARY SIGNALS

(75) Inventors: Anne Ferreol, Colombes (FR); Pascal Chevalier, Courbevoie (FR); Laurent Albera, Boulogne-Billancourt (FR)

(73) Assignee: Thales (FR)

( * ) Notice: Subject to any disclaimer, the term of this patent is extended or adjusted under 35 U.S.C. 154(b) by 742 days.

(21) Appl. No.: 10/428,015

(22) Filed: May 2, 2003

(65) Prior Publication Data

US 2003/0227410 A1 Dec. 11, 2003

(30) Foreign Application Priority Data

May 3, 2002 (FR) .................................. 02 05575

(51) Int. Cl.
*G01S 5/02* (2006.01)
*G01S 3/16* (2006.01)
*G06F 17/16* (2006.01)
(52) U.S. Cl. ........................ 342/417; 342/378; 702/190
(58) Field of Classification Search ........................ None
See application file for complete search history.

(56) References Cited

OTHER PUBLICATIONS

Abed-Meraim, K. et al, "Blind Source Separation Using Second Order Cyclostationary Statisics," IEEE Trans. on Signal Processing, vol. 49, No. 4, Apr. 2001, pp. 694-701.*

Choi, Seungjin et al, "Blind Separation of Second-Order Nonstationary and Temporally Colored Sources," Proc. of t 3rd International Conf. on Independent Component Analysis and Blind signal Separation, Dec. 2001 (4 pages).*

Liang, Ying-Chan et al, "A Network Structure Approach to Blind Source Separation Using Second Order Cyclic Statistics," IEEE International Symposium on Circuits and Systems, Jun. 9-12, 1997, p. 2549-2552.*

Antoni, J. et al, Blind Separation and Identification of Cyclostationary Processes, IEEE Internaitonal Conf on Acoustics, Speech, and Signal Processing, 2002, vol. 3, pp. 3077-3080.*

Chevalier, Pascal et al, "(Behavior of Higher Order Blind Source Separation Methods in the Presence of Cyclostationary Correlated Multipaths," Proc of the IEEE Signal Processing Workshop on Higher-Order Statistics, Jul. 1997, pp. 363-367.*

Ferreol, Anne et al, "On the Fourth Order Cumulants Estimation for the HO Blind Separation of Cyclostationary Sources", Proc of the 1998 IEEE International Conf. on Acoustic, Speech, and Signal Processing, May 1998, pp. 2313-2316 vol. 4.*

Zeng, Hanks et al, "Blind Channel Estimation Using Second-Order Statistics: Algorithms," IEEE Trans. on Signal Processing, vol. 45, No. 8, Aug. 1997, pp. 1919-1930.*

(Continued)

*Primary Examiner*—Gregory C Issing
(74) *Attorney, Agent, or Firm*—Lowe Hauptman Ham & Berner, LLP

(57) ABSTRACT

An antenna processing method for centered or potentially non-centered cyclostationary signals, comprises at least one step in which one or more nth order estimators are obtained from r-order statistics, with r=1 to n−1, and for one or more values of r, it comprises a step for the correction of the estimator by means of r-order detected cyclic frequencies. The method can be applied to the separation of the emitter sources of the signals received by using the estimator or estimators.

6 Claims, 5 Drawing Sheets

OTHER PUBLICATIONS

Ferreol, et al., "On the Behavior of Current Second and Higher Order Blind Source Separation Methods for Cyclostationary Sources", IEEE Transactions on Signal Processing, vol. 48, No. 6, Jun. 2000, pp. 1712-1725.

Abed-Meraim K., et al., "Blind Source Separation Using Second-Order Cyclostationary Statistics", Information, Decision and Control, IEEE 1999 Proceedings, Feb. 8, 1999, pp. 321-326.

Liang Y-C, et al., "Blind Source Separation Using Second-Order Cyclic-Statistics", Signal Processing Advances in Wireless Communications, IEEE, Apr. 16, 1997, pp. 57-60.

Abed-Meriam K., et al. "A New Approach to Blind Separation of Cyclostationary Sources", Signal Processing Advances in Wireless Communications, IEEE 1999 Proceedings, May 9, 1999, pp. 114-117.

* cited by examiner

"Prior Art"

"Prior Art"

ANTENNA PROCESSING METHOD FOR POTENTIALLY NON-CENTERED CYCLOSTATIONARY SIGNALS

BACKGROUND OF THE INVENTION

1. Field of the Invention

The invention relates to an antenna processing method for potentially non-centered or centered cyclostationary sources.

It can be applied for example to CPFSK sources with integer modulation index.

The invention relates, for example, to a method for the separation of potentially non-centered, cyclostationary signals received by a receiver of a communications system comprising several sources or emitters. The term "cyclostationary" also designates the particular case of stationary signals.

It can also be applied to the angular localization or goniometry of potentially non-centered cyclostationary sources.

The invention can be applied especially in radiocommunications, space telecommunications or passive listening to these links, in frequencies ranging from the VLF (Very Low Frequency) to the EHF (Extremely High Frequency).

In the present description, the term "blind separation" designates the separation of emitters with no knowledge whatsoever of the signals sent, the term "centered signal" refers to a signal without any continuous component that verifies $E[x(t)]=0$, and the term "non-stationary signal" refers to a signal whose statistics are time-dependent.

2. Description of the Prior Art

In many contexts of application, the reception of signals of interest for the receiver is very often disturbed by the presence of other signals (or sources) known as parasites, which may correspond either to delayed versions of the signals of interest (through multiple-path propagation), or to interfering sources which may be either deliberate or involuntary (in the case of co-channel transmissions). This is especially the case with radiocommunications in urban areas, subject to the phenomenon of multiple paths resulting from the reflections of the signal on surrounding fixed or moving obstacles potentially disturbed by the co-channel transmissions coming from the neighboring cells that re-use the same frequencies (in the case of F/TDMA or Frequency/Time Division Multiple Access networks). This is also the case with the HF (High Frequency) ionospherical links disturbed by the presence, at reception, of the multiple paths of propagation resulting from the reflections on the different ionospherical layers and of parasitic emitters due to high spectral congestion in the HF range.

For all these applications, whether it is for purposes of radiocommunications or for listening and technical analysis of the sources received, the sources need to be separated before other processing operations specific to the application considered are implemented. Furthermore, for certain applications such as passive listening, the sources received are totally unknown to the receiver (there are no available learning sequences, the waveforms are unknown, etc.) and their angular localization or goniometry may prove to be difficult (because of coupling between sensors) or costly (because of the calibration of the aerials) to implement. This is why it may prove to be highly advantageous to implement a source separation technique in a totally autodidactic or self-learning way, that is, by making use of no a priori information on the sources, apart from the assumption of the statistical independence of these sources.

The first studies on the separation of sources by self-learning appeared in the mid-1980s in the work of Jutten and Herault [1]. Since then, these studies have been constantly developing for mixtures of sources, both convolutive (time-spread multiple-path propagation channels) and instantaneous (distortion-free channels). A conspectus of these studies is presented in the article [2] by P. Comon and P. Chevalier. A certain number of techniques developed are called second-order techniques because they use only the information contained in the second-order statistics of the observations, as described in reference [3] for example. By contrast, other techniques, known as higher-order techniques, described for example in the reference [4], generally use not only second-order information but also information contained in statistics above the second order. These include the techniques known as cumulant-based, fourth-order techniques which have received special attention owing to their performance potential (reference [2]) and the relative simplicity of their implementation.

However, almost all the techniques of self-learned source separation available to date have been designed to separate sources assumed to be stationary, centered and ergodic, on the basis of estimators of statistics of observations qualified as being empirical, asymptotically unbiased and consistent on the basis of the above assumptions.

Two families of second-order separators are presently available. Those of the first family (F1) (reference [3], using the SOBI method shown schematically in FIG. 1) are aimed at separating statistically independent sources assumed to be stationary, centered and ergodic whereas those of the second family (F2) (reference [6], using the cyclic SOBI method) are designed to separate statistically independent sources assumed to be cyclostationary, centered and cycloergodic.

Two families of fourth-order separators are presently available. For example, those of the first family (F3) (reference [4] by J. F. Cardoso and A. Souloumiac, using the JADE method shown schematically in FIG. 2) are aimed at separating statistically independent sources assumed to be stationary, centered and ergodic while those of the second family (F4) (reference A. Ferreol and Chevalier [8] using the cyclic JADE technique) are designed to separate statistically independent sources assumed to be cyclostationary, centered and cycloergodic.

However, most of the sources encountered in practice are non-stationary and, more particularly, cyclostationary (with digitally modulated sources) and in certain cases deterministic (pure carriers). Furthermore, some of these sources are not centered. This is especially the case for deterministic sources and for certain digitally and non-linearly modulated sources as in the case of CPFSK sources with integer modulation index. This means that the empirical estimators of statistics classically used to implement the current techniques of self-learned source separation no longer have any reason to remain unbiased and consistent but are liable to become asymptotically biased. This may prevent the separation of the sources as shown in the document by A. Ferreol and P. Chevalier [5] for centered cyclostationary sources (linear digital modulations).

SUMMARY OF THE INVENTION

The invention relates to an antenna processing method for centered or potentially non-centered cyclostationary signals, comprising at least one step in which an nth order statistics estimator is obtained from r-order statistics, with r=1 to n−1, and for one or more values of r, a step for the correction of the empirical estimators, by means of r-order detected cyclic frequencies, exploiting the potentially non-centered character of the observations.

It comprises for example a step for the separation of the emitter sources of the signals received by using one of the second-order estimators or fourth-order estimators proposed.

It is also used for the angular localization or goniometry of the signals received.

BRIEF DESCRIPTION OF THE DRAWINGS

Other features and advantages of the inventions shall appear more clearly from the following description of a non-exhaustive exemplary embodiment and from the appended figures, of which.

MORE DETAILED DESCRIPTION

Figure 9:
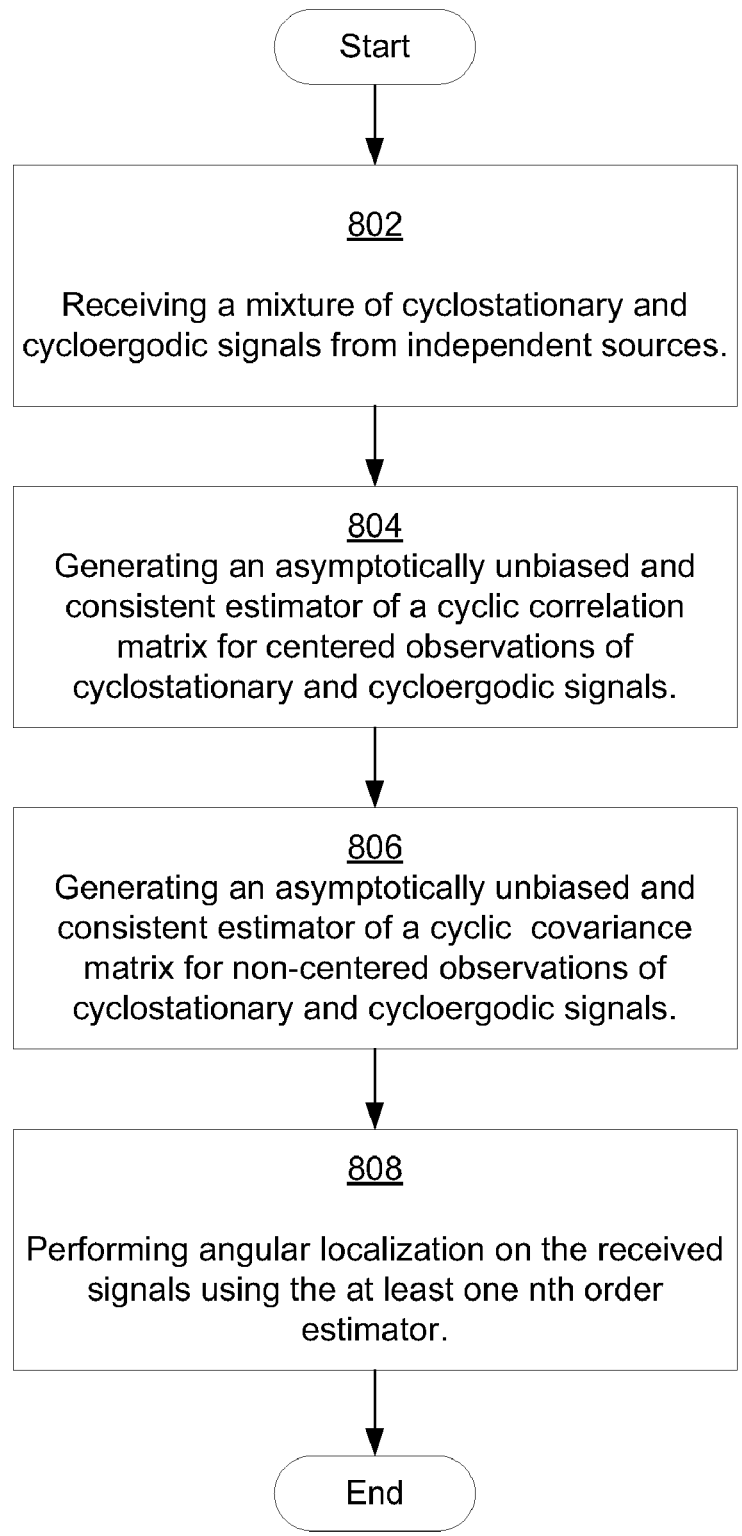
FIG. 9 is a high level drawing of the steps implemented according to the invention.

The method according to the invention enables the processing especially of potentially non-centered or centered cyclostationary sources. It can be applied, for example, to the separation of the sources or to their angular localization or goniometry. FIG. 9 illustrates wherein the method comprises at least the steps of: (802) receiving a mixture of cyclostationary and cycloergodic signals from independent sources; (804) generating an asymptotically unbiased and consistent estimator of a cyclic correlation matrix for centered observations of cyclostationary and cycloergodic signals; (806) generating an asymptotically unbiased and consistent estimator of a cyclic covariance matrix for non-centered observations of cyclostationary and cycloergodic signals; and (808) performing angular localization on the received signals using the at least one nth order estimator.

Figure 1:
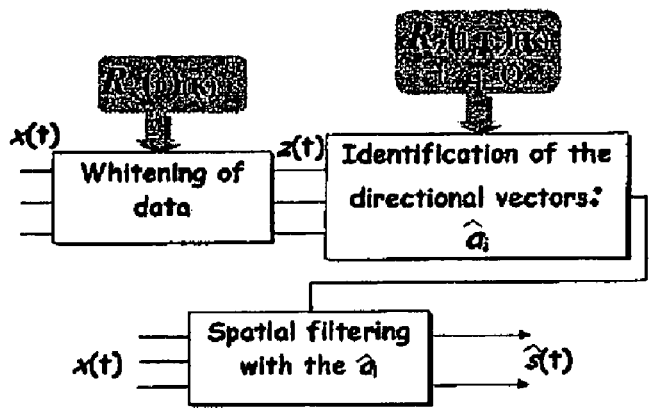
FIGS. 1 and 2 show prior art separation techniques, respectively known as the SOBI and JADE techniques, FIG. 3 exemplifies a receiver according to the invention.
Figure 2:
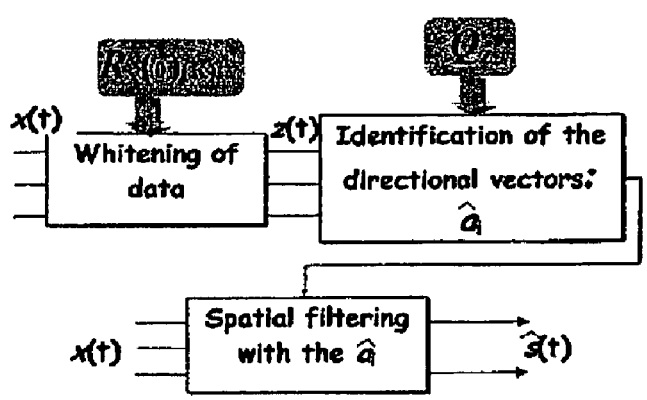
Figure 3:
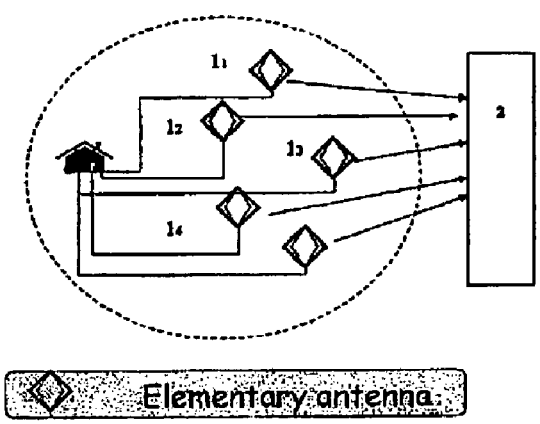
Figure 4:
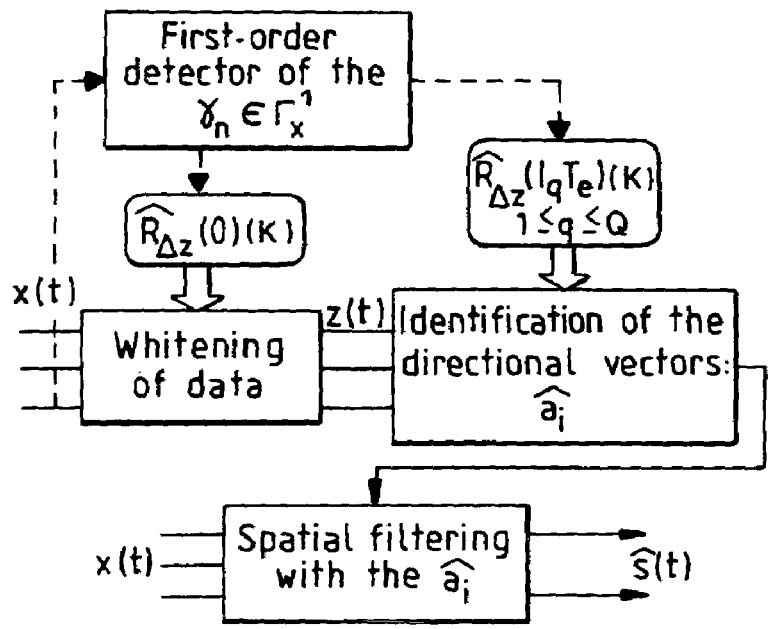
FIG. 4 is a diagram of the steps according to the invention applied to the SOBI technique of separation.
Figure 5:
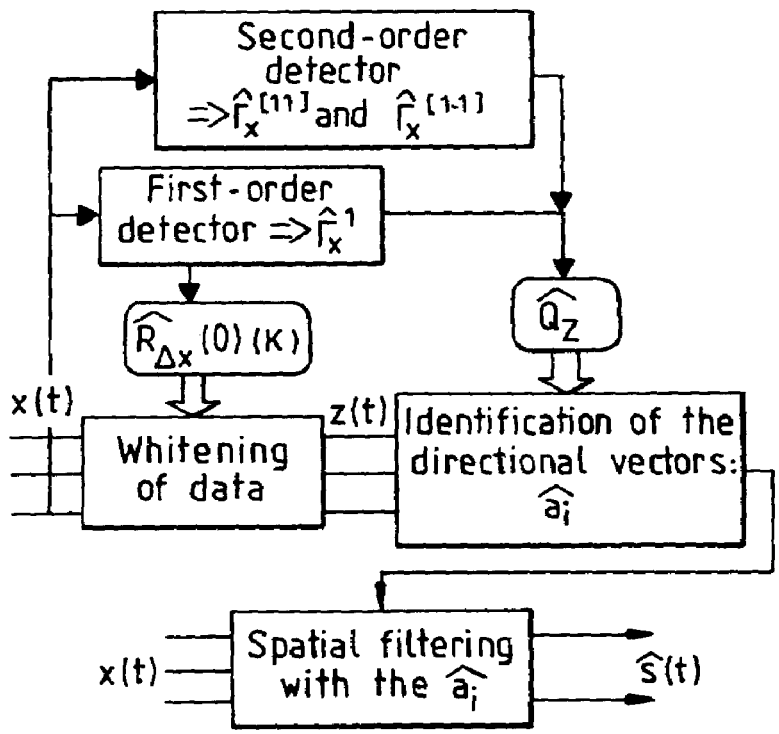
FIG. 5 is a diagram of the steps of the method according to the invention applied to the JADE technique of separation.

FIG. 3 gives a diagrammatic view of an exemplary receiver comprising, for example, N reception sensors ($1_1$, $1_2$, $1_3$, $1_4$) each connected to several inputs of a processing device 2 such as a processor adapted to executing the steps of the method described here below.

Before describing various alternative modes of implementation of the method according to the invention, we shall describe the way to obtain the estimators, for example second-order or fourth-order estimators, as well as the detection of the cyclic frequencies.

Modelling of the Signal

It is assumed that an antenna with N sensors receives a noise-ridden mixture from P (P≦N) narrow-band (NB) and statistically independent sources. On the basis of these assumptions, the vector, x(t) of the complex envelopes of the output signals from the sensors is written, at the instant t, as follows:

$$x(t) = \sum_{p=1}^{P} m_p(t)e^{j(2\pi \Delta f_p t + \phi_p)} a_p + b(t) \triangleq Am_c(t) + b(t) \quad (1)$$

where b(t) is the noise vector, assumed to be centered, stationary, circular and spatially white, $m_p(t)$, $\Delta f_p$, $\phi_p$ and $a_p$ correspond respectively to the complex, narrow-band (NB), cyclostationary and potentially non-centered envelope (deterministic as the case may be), to the residue of the carrier, to the phase and to the directional vector of the source p, $m_c(t)$ is the vector whose components are the signals $m_{pc}(t) \triangleq m_p(t) \exp[j(2\pi \Delta f_p t + \phi_p)]$ and A is the matrix (N×P) whose columns are the vectors $a_p$.

Statistics of the Observations

First Order Statistics

In the general case of cyclostationary and non-centered sources, the first-order statistics of the vector x(t), given by (1), are written as follows:

$$e_x(t) \triangleq E[x(t)] = \sum_{p=1}^{P} e_p(t)e^{j(2\pi \Delta f_p t + \phi_p)} a_p \triangleq \sum_{p=1}^{P} e_{pc}(t)a_p \triangleq A e_{mc}(t) \quad (2)$$

where $e_p(t)$, $e_{pc}(t)$ and $e_{mc}(t)$ are the mathematical expectation values respectively of $m_p(t)$, $m_{pc}(t)$ and $m_c(t)$. The vectors $e_p(t)$ and $e_{pc}(t)$ accept a Fourier series decomposition, and we obtain:

$$e_{pc}(t) \triangleq E[m_{pc}(t)] = \sum_{\gamma_{pc} \in \Gamma_{pc}^1} e_{pc}^{\gamma_{pc}} e^{j2\pi \gamma_{pc} t} = \sum_{\gamma_p \in \Gamma_p^1} e_p^{\gamma_p} e^{j[2\pi(\Delta f_p + \gamma_p)t + \phi_p]} \quad (3)$$

where $$\Gamma_p^1 = \{\gamma_p\} \text{ and } \Gamma_{pc}^1 = \{\gamma_{pc} = \gamma_p + \Delta f_p\}$$

are the sets of the cyclic frequencies $\gamma_p$ and $\gamma_{pc}$ respectively of $e_p(t)$ and $e_{pc}(t)$, $$e_p^{\gamma_p} \text{ and } e_{pc}^{\gamma_{pc}}$$

are the cyclic mean values respectively $m_p(t)$ and $m_{pc}(t)$, defined by $$e_p^{\gamma_p} \triangleq \; <e_p(t)e^{-j2\pi \gamma_p t}>_c \quad (4)$$

$$e_{pc}^{\gamma_{pc}} \triangleq \; <e_{pc}(t)e^{-j2\pi \gamma_{pc} t}>_c = e_p^{\gamma_{pc}-\Delta f_p} e^{j\phi_p} \quad (5)$$

where the symbol $$< f(t) >_c \stackrel{\Delta}{=} \lim_{T \to \infty} (1/T) \int_{-T/2}^{T/2} f(t) dt$$

corresponds to the operation of taking the temporal mean in continuous time f(t) on an infinite horizon of observation. Consequently, the vectors $e_{mc}(t)$ and $e_x(t)$ also accept a Fourier series decomposition and, by using (2) and (3), we get:

$$e_{mc}(t) \stackrel{\Delta}{=} \sum_{\gamma \in \Gamma_x^1} e_{mc}^\gamma e^{j2\pi\gamma t} \qquad (6)$$

$$e_x(t) \stackrel{\Delta}{=} \qquad (7)$$

$$\sum_{\gamma \in \Gamma_x^1} e_x^\gamma e^{j2\pi\gamma t} = \sum_{\gamma \in \Gamma_x^1} A e_{mc}^\gamma e^{j2\pi\gamma t} = \sum_{p=1}^{P} \sum_{\gamma_{pc} \in \Gamma_{pc}^1} e_{pc}^{\gamma_{pc}} e^{j2\pi\gamma_{pc}t} a_p$$

where $$\Gamma_x^1 = \bigcup_{1 \leq p \leq P} \{\Gamma_{pc}^1\}$$

is the set of the cyclic frequencies $\gamma$ of $e_{mc}(t)$ and $e_x(t)$, $$e_{mc}^\gamma$$

and $$e_x^\gamma \text{ and } e_x^\gamma$$

are respectively the cyclic means of $m_c(t)$ and $x(t)$, defined by:

$$e_{mc}^\gamma = < e_{mc}(t) e^{-j2\pi\gamma t} >_c \qquad (8)$$

$$e_x^\gamma = < e_x(t) e^{-j2\pi\gamma t} >_c \qquad (9)$$

Assuming these conditions, the (quasi-)cyclostationary vector x(t) can be decomposed into the sum of a deterministic and (quasi-)periodic part $e_x(t)$ and a (quasi-)cyclostationary, centered, random part $\Delta x(t)$ such that:

$$\Delta x(t) \stackrel{\Delta}{=} x(t) - e_x(t) = A \Delta m_c(t) + b(t) \qquad (10)$$

where $\Delta m_c(t) \stackrel{\Delta}{=} m_c(t) - e_{mc}(t)$ is the centered vector of the source signals, with components $\Delta m_{pc}(t)$ $\stackrel{\Delta}{=} m_{pc}(t) - e_{pc}(t) = \Delta m_p(t) \, e^{j(2\pi\Delta f_p t + \phi_p)}$ where $\Delta m_p(t) \stackrel{\Delta}{=} m_p(t) - e_p(t)$.

Special Cases

By way of an indication, $e_p(t) = 0$ for a digitally and linearly modulated source p, which is centered. However, $e_p(t) \neq 0$ for a deterministic (carrier) source p as well as for certain digitally and non-linearly modulated sources such as CPFSKs with integer index, whose complex envelope is written as follows:

$$m_p(t) = \pi_p^{1/2} \sum_n \exp\{j[\theta_{pn} + 2\pi f_{dp} a_n^p (t - nT_p)]\} \, Rect_p(t - nT_p) \qquad (11)$$

where $T_p$ corresponds to the symbol duration of the source, $\pi_p \stackrel{\Delta}{=} E[|m_p(t)|^2]>_c$ is the mean power of the source p received by an omnidirectional sensor, the $$a_n^p$$

are the transmitted $M_p$-ary symbols, assumed to be i.i.d and taking their values in the alphabet $\pm 1, \pm 3, \ldots, \pm(M_p-1)$, where $M_p$ is generally a power of 2, $Rect_p(t)$ is the rectangular pulse with an amplitude 1 and a duration $T_p$, $f_{dp} \stackrel{\Delta}{=} h_p/2T_p$ is the frequency deviation, $h_p$ is the index of modulation of the source and $\theta_{pn}$, which corresponds to the accumulation of all the symbols up to the instant $(n-1)T_p$, is defined by:

$$\theta_{pn} \stackrel{\Delta}{=} 2\pi f_{dp} T_p \sum_{k=-\infty}^{n-1} a_k^p \qquad (12)$$

For $M_p$-ary symbols, the associated CPFSK source is called an $M_p$-CPFSK source. For this type of source, the set $\Gamma_p^1$ of the first-order cyclic frequencies of the source p is written as $$\Gamma_p^1 = \{\gamma_p = \pm(2k+1) f_{dp},$$

$0 \leq k \leq (M_p-2)/2\}$. Thus we get:

$$e_p^\gamma = \pm \pi_p^{1/2} \frac{1}{M_p} \text{ for } \gamma \in \Gamma_p^1 \qquad (13)$$

Second-Order Statistics

Based on the above assumptions (non-centered, cyclostationary sources), the second-order statistics of the observations are characterized by the two correlation matrices $R_{x\epsilon}(t, \tau)$ for $\epsilon=1$ and $\epsilon=-1$, dependent on the current time t and defined by:

$$R_{x\epsilon}(t,\tau) \stackrel{\Delta}{=} E[x(t)x(t-\tau)^{\epsilon T}] = A R_{mc\epsilon}(t,\tau) A^{\epsilon T} + \eta_2(\tau)\delta(1+\epsilon)I \qquad (14)$$

where $\epsilon = \pm 1$, with the convention $x^1 \stackrel{\Delta}{=} x$ and $x^{-1} \stackrel{\Delta}{=} x^*$, $*$ is the complex conjugation operation, $\delta(.)$ is the Kronecker symbol, $^T$ signifies transposed, $\eta_2(\tau)$ is the correlation function of the noise on each sensor, I is the identity matrix, the matrix $R_{mc\epsilon}(t, \tau) \stackrel{\Delta}{=} E[m_c(t) \, m_c(t-\tau)^{\epsilon T}]$ introduces the first and second correlation matrices of the vector $m_c(t)$.

In the general case of non-centered cyclostationary sources using (10) in (14), the matrix $R_{x\epsilon}(t, \tau)$ takes the following form:

$$R_{x\epsilon}(t,\tau) = R_{\Delta x\epsilon}(t,\tau) + e_x(t) e_x(t-\tau)^{\epsilon T} \qquad (15)$$

where $R_{\Delta x\epsilon}(t, \tau)$ introduces the first and second matrices of covariance of x(t) or of correlation of $\Delta x(t)$, defined by $$R_{\Delta x\epsilon}(t,\tau) \triangleq E[\Delta x(t)\Delta x(t-\tau)^{\epsilon T}] = A R_{\Delta mc\epsilon}(t,\tau)A^{\epsilon T} + \eta_2(\tau)\delta(1+\epsilon)I \quad (16)$$

where $R_{\Delta mc\epsilon}(t, \tau) \triangleq E[\Delta m_c(t) \Delta m_c(t-\tau)^{\epsilon T}]$ defines the first and second matrices of covariance of $m_c(t)$ such that:

$$R_{mc\epsilon}(t,\tau) = R_{\Delta mc\epsilon}(t,\tau) + e_{mc}(t)e_{mc}(t-\tau)^{\epsilon T} \quad (17)$$

Using (1), (10) and the assumption of statistical independence of the sources in (16), we get:

$$R_{\Delta x\epsilon}(t,\tau) = \sum_{p=1}^{P} r_{\Delta p\epsilon}(t,\tau) e^{j[(1+\epsilon)(2\pi\Delta f_p t + \phi_p) - 2\pi\Delta f_p \tau\epsilon]} a_p a_p^{\epsilon T} + \eta_2(\tau)I \quad (18)$$
$$= \sum_{p=1}^{P} r_{\Delta pc\epsilon}(t,\tau) a_p a_p^{\epsilon T} + \eta_2(\tau)\delta(1+\epsilon)I$$

where $r_{\Delta p\epsilon}(t,\tau) \triangleq E[\Delta m_p(t) \Delta m_p(t-\tau)^\epsilon]$, $r_{\Delta pc\epsilon}(t,\tau) \triangleq E[\Delta m_{pc}(t) \Delta m_{pc}(t-\tau)^\epsilon]$. From the expressions (2) and (18) a new writing of the expression (15) is finally deduced and is given by:

$$R_{x\epsilon}(t,\tau) = \quad (19)$$
$$\sum_{p=1}^{P} r_{\Delta pc\epsilon}(t,\tau) a_p a_p^{\epsilon T} + \sum_{p=1}^{P}\sum_{q=1}^{P} e_{pc}(t) e_{qc}(t-\tau)^\epsilon a_p a_p^{\epsilon T} + \eta_2(\tau)\delta(1+\epsilon)I$$

For cyclostationary sources, the functions of covariance $r_{\Delta pc\epsilon}(t, \tau)$, $1 \leq p \leq P$, and hence the matrices $R_{\Delta mc\epsilon}(t, \tau)$ and $R_{\Delta x\epsilon}(t, \tau)$ are (quasi-) or polyperiodic functions of the time t accepting a Fourier series decomposition, and we get:

$$r_{\Delta pc\epsilon}(t,\tau) = \sum_{\alpha_{\Delta pc\epsilon} \in \Gamma_{\Delta pc}^{[1,\epsilon]}} r_{\Delta pc\epsilon}^{\alpha_{\Delta pc\epsilon}}(\tau) e^{j2\pi\alpha_{\Delta pc\epsilon} t} \quad (20)$$

$$R_{\Delta x\epsilon}(t,\tau) = \sum_{\alpha_{\Delta x\epsilon} \in \Gamma_{\Delta x}^{[1,\epsilon]}} R_{\Delta x\epsilon}^{\alpha_{\Delta x\epsilon}}(\tau) e^{j2\pi\alpha_{\Delta x\epsilon} t} \quad (21)$$

where $$\Gamma_{\Delta pc}^{[1,\epsilon]} = \{\alpha_{\Delta pc\epsilon}\}$$

is the set of the cyclic frequencies $\alpha_{\Delta pc\epsilon}$ of $$r_{\Delta pc\epsilon}(t,\tau), \; \Gamma_{\Delta x}^{[1,\epsilon]} = \{\alpha_{\Delta x\epsilon}\} = \bigcup_{1 \leq p \leq P} \{\Gamma_{\Delta pc}^{[1,\epsilon]}\}$$

is the set of cyclic frequencies $\alpha_{\Delta x\epsilon}$ of $R_{\Delta x\epsilon}(t,\tau)$, the quantities $$r_{\Delta pc\epsilon}^{\alpha_{\Delta pc\epsilon}}(\tau)$$

define the first ($\epsilon=-1$) and second ($\epsilon=1$) functions of cyclic covariance of $m_{pc}(t)$ while the matrices $$R_{\Delta x\epsilon}^{\alpha_{\Delta x\epsilon}}(\tau)$$

define the first and second matrices of cyclic covariance of x(t), respectively defined by $$r_{\Delta pc\epsilon}^{\alpha_{\Delta pc\epsilon}}(\tau) = \langle r_{\Delta pc\epsilon}(t,\tau) e^{-j2\pi\alpha_{\Delta pc\epsilon} t}\rangle_c \quad (22)$$

$$R_{\Delta x\epsilon}^{\alpha_{\Delta x\epsilon}}(\tau) = \langle R_{\Delta x\epsilon}(t,\tau) e^{-j2\pi\alpha_{\Delta x\epsilon} t}\rangle_c = A R_{\Delta mc\epsilon}^{\alpha_{\Delta x\epsilon}}(\tau) A^{\epsilon T} + \eta_2(\tau)\delta(\alpha_{\Delta x\epsilon})\delta(1+\epsilon)I \quad (23)$$

where $$R_{\Delta mc\epsilon}^{\alpha_{\Delta x\epsilon}}(\tau)$$

defines the first and second matrices of cyclic covariance of $m_c(t)$. Using the expressions (7) and (21) in (15), we get $$R_{x\epsilon}(t,\tau) = \quad (24)$$
$$\sum_{\alpha_{\Delta x\epsilon} \in \Gamma_{\Delta x}^{[1,\epsilon]}} R_{\Delta x\epsilon}^{\alpha_{\Delta x\epsilon}}(\tau) e^{j2\pi\alpha_{\Delta x\epsilon} t} + \sum_{\gamma \in \Gamma_x^1}\sum_{\omega \in \Gamma_x^1} e_x^\gamma e_x^{\omega\epsilon T} e^{-j2\pi\omega\tau\epsilon} e^{j2\pi(\gamma+\omega\epsilon)t}$$

which shows that the matrices $R_{x\epsilon}(t, \tau)$ accept a Fourier series decomposition $$R_{x\epsilon}(t,\tau) = \sum_{\alpha_{x\epsilon} \in \Gamma_x^{[1,\epsilon]}} R_{x\epsilon}^{\alpha_{x\epsilon}}(\tau) e^{j2\pi\alpha_{x\epsilon} t} \quad (25)$$

where $$\Gamma_x^{[1,\epsilon]} = \{\alpha_{x\epsilon}\} = \Gamma_{\Delta x}^{[1,\epsilon]} \cup \{\Gamma_x^1 o_\epsilon \Gamma_x^1\}$$

is the set of the cyclic frequencies $\alpha_{x\epsilon}$ of $$R_{x\epsilon}(t,\tau), \; \Gamma_x^1 o_\epsilon \Gamma_x^1 = \{\alpha = \gamma + \epsilon\omega \text{ where } \gamma \in \Gamma_x^1, \omega \in \Gamma_x^1\},$$

the matrices $$R_{x\epsilon}^{\alpha_{x\epsilon}}(\tau)$$

are the first ($\epsilon=-1$) and second ($\epsilon=+1$) matrices of cyclic correlation of x(t), defined by $$R_{x\varepsilon}^{\alpha_{x\varepsilon}}(\tau) = \ <R_{x\varepsilon}(t, \tau)e^{-j2\pi\alpha_{x\varepsilon}t}>_c = \quad (26)$$
$$A R_{mc\varepsilon}^{\alpha_{x\varepsilon}}(\tau)A^{\varepsilon T} + \eta_2(\tau)\delta(\alpha_{x\varepsilon})\delta(1+\varepsilon)I$$

where $$R_{mc\varepsilon}^{\alpha_{x\varepsilon}}(\tau)$$

defines the first and second matrices of cyclic correlation of $m_c(t)$. In particular, for the zero cyclic frequency, the matrix $$R_{x\varepsilon}^{\alpha_{x\varepsilon}}(\tau)$$

corresponds to the temporal mean in t, $R_{x\epsilon}(\tau)$, de $R_{x\epsilon}(t, \tau)$ which is written, using (14), $$R_{x\epsilon}(\tau) \triangleq <R_{x\epsilon}(t,\tau)>_c = AR_{mc\epsilon}(\tau)A^{\epsilon T} + \eta 2(\tau)\delta(1+\epsilon)I \quad (27)$$

where, using (17), the matrix $R_{mc\epsilon}(\tau) \triangleq <R_{mc\epsilon}(t, \tau)>_c$ is written $$R_{mc\epsilon}(\tau) \triangleq <R_{mc\epsilon}(t,\tau)>_c = R_{\Delta mc\epsilon}(\tau) + <e_{mc}(t)e_{mc}(t-\tau)^{\epsilon T}>_c = \\ R_{\Delta mc\epsilon}(\tau) + E_{mc\epsilon}(\tau) \quad (28)$$

where $R_{\Delta mc\epsilon}(\tau) \triangleq <R_{\Delta mc\epsilon}(t, \tau)>_c$ and $E_{mc\epsilon}(\tau) \triangleq <e_{mc}(t) e_{mc}(t-\tau)^{\epsilon T}>c$.

Empirical Estimator of the Second-Order Statistics

In practice, the second-order statistics of the observations are unknown in principle and must be estimated by the taking the temporal mean on a finite period of observation, on the basis of a number K of samples x(k) ($1 \leq k \leq K$), of the observation vector x(t), using the property of ergodicity of these samples in the stationary case and of cycloergodicity of these samples in the cyclostationary case. If $T_e$ denotes the sampling period, the estimation of the cyclic correlation matrix $$R_{x\epsilon}^{\alpha}(\tau)$$

for $\tau = lT_e$, which corresponds to a matrix of cumulants only for centered observations, is done only by means of the estimator $$\hat{R}_{x\epsilon}^{\alpha}(lT_e)(K)$$

qualified as empirical and defined by $$\hat{R}_{x\epsilon}^{\alpha}(lT_e)(K) \triangleq \frac{1}{K}\sum_{k=1}^{K} x(k)x(k-l)^{\epsilon T} e^{-j2\pi\alpha kT_e} \quad (29)$$

The method according to the invention comprises, for example, a novel step to determine a second-order estimator.

Novel Estimator of the Second-Order Cyclic Cumulants of the Observations

In the presence of non-centered observations, the matrices of correlation of the observations $R_{x\epsilon}(t, \tau)$ no longer correspond to the matrices of covariance or of second-order cumulants of the observations, as indicated by the expression (15). This is also the case with the matrices of cyclic correlation, $$R_{x\varepsilon}^{\alpha_{x\varepsilon}}(\tau),$$

defined by (26) which, for non-centered observations, no longer correspond to the matrices of covariance or matrices of second-order cyclic cumulants $$R_{\Delta x\varepsilon}^{\alpha_{x\varepsilon}}(\tau),$$

defined by (22) for $\alpha_{\Delta x\epsilon} = \alpha_{x\epsilon}$. Thus, an efficient operation of the second-order separators F1 and F2 with respect to the potentially non-centered cyclostationary sources can be obtained only by making use of the information contained in the matrices $$R_{\Delta x\varepsilon}^{\alpha_{x\varepsilon}}(\tau)$$

rather than in the matrices $$R_{x\varepsilon}^{\alpha_{x\varepsilon}}(\tau).$$

Thus, in as much as, for cyclostationary and cycloergodic sources, the empirical estimator (29) is an asymptotically unbiased and consistent estimator of the matrix of cyclic correlation $$R_{x\varepsilon}^{\alpha}(lT_e),$$

another estimator is used for non-centered observations. This other estimator is aimed at making an asymptotically unbiased and consistent estimation of the matrix of cyclic covariance $$R_{\Delta x\varepsilon}^{\alpha}(lT_e).$$

From the expressions (24) and (25), we deduce the expression of the matrix of cyclic covariance $$R_{\Delta x\varepsilon}^{\alpha}(lT_e)$$

as a function of that of $$R_{x\varepsilon}^{\alpha}(lT_e),$$

given by $$R^\alpha_{\Delta x \varepsilon}(lT_e) = R^\alpha_{x\varepsilon}(lT_e) - \sum_{\omega \in \Gamma^1_x} e^{\alpha-\omega \varepsilon}_x e^{\omega \varepsilon T}_x e^{-j2\pi \omega \varepsilon l T_e} \qquad (30)$$

Thus, the estimation of the matrix of cyclic covariance $$R^\alpha_{\Delta x \varepsilon}(lT_e)$$

is made from the estimator $$\hat{R}^\alpha_{\Delta x \varepsilon}(lT_e)(K)$$

defined by $$\hat{R}^\alpha_{\Delta x \varepsilon}(lT_e)(K) \triangleq \hat{R}^\alpha_{x\varepsilon}(lT_e)(K) - \sum_{\omega \in \Gamma^1_x} \hat{e}^{\alpha-\omega \varepsilon}_x(K) \hat{e}^\omega_x(K)^{\varepsilon T} e^{-j2\pi \omega \varepsilon l T_e} \qquad (31)$$

where $$\hat{R}^\alpha_{\Delta x \varepsilon}(lT_e)(K)$$

is defined by (29) and where $$\hat{e}^\omega_x(K)$$

is defined by $$\hat{e}^\omega_x(K) \triangleq \frac{1}{K} \sum_{k=1}^{K} x(k) e^{-j2\pi \omega k T_e} \qquad (32)$$

Thus, assuming cyclostationary and cycloergodic observations, whether centered or not, the estimator (31) is an asymptotically unbiased and consistent estimator of the matrix of cyclic covariance or matrix of second-order cyclic cumulants $$R^\alpha_{\Delta x \varepsilon}(lT_e).$$

In particular, the separators F1 must exploit the estimator (31) for $\alpha=0$ and $\varepsilon=-1$, written as $$\hat{R}_{\Delta x}(lT_e)(K),$$

and defined by $$\hat{R}_{\Delta x}(lT_e)(K) \triangleq \hat{R}_x(lT_e)(K) - \sum_{\omega \in \Gamma^1_x} \hat{e}^\omega_x(K) \hat{e}^\omega_x(K)^\dagger e^{j2\pi \omega l T_e} \qquad (33)$$

where $\hat{R}_x(lT_e)(K)$ is defined by (29) with $\alpha=0$ and $\varepsilon=-1$.

According to another alternative embodiment, the method includes a step for determining a new fourth-order estimator.

Third-Order Statistics

Based on the above assumptions, the third-order statistics (moments) of the observations are defined by (34)

$$T_{x\varepsilon}(t,\tau_1,\tau_2)[i,j,k] \triangleq E[x_i(t) x_j(t-\tau_1)^\varepsilon x_k(-\tau_2)] =$$
$$E[\Delta x_i(t) \Delta x_j(t-\tau_1)^\varepsilon \Delta x_k(t-\tau_2)] + e_x[i](t) E[\Delta x_j(t-\tau_1)^\varepsilon \Delta x_k(t-\tau_2)] +$$
$$e_x[k](t-\tau_2) E[\Delta x_i(t) \Delta x_j(t-\tau_1)^\varepsilon] + e_x[j](t-\tau_1)^\varepsilon E[\Delta x_i(t) \Delta x_k(t-\tau_2)] +$$
$$4 e_x[i](t) e_x[j](t-\tau_1)^\varepsilon e_x[k](t-\tau_2)$$

where $ex_x[i](t) = e_{xi}(t)$ is the component i of $e_x(t)$. The third-order cumulants are the quantities $E[\Delta x_i(t) \Delta x_j(t-\tau_1)^\varepsilon \Delta x_k(t-\tau_2)]$. Assuming that the term $T_{x\varepsilon}(t, \tau_1, \tau_2)[i, j, k]$ is the element $[i, N(j-1)+k]$ of the matrix $T_{x\varepsilon}(t, \tau_1, \tau_2)$, with a dimension $(N \times N^2)$, we get an expression of this matrix given by:

$$T_{x\varepsilon}(t, \tau_1, \tau_2) = A T_{mc\varepsilon}(t, \tau_1, \tau_2)(A \otimes A^\varepsilon)^{\varepsilon T} = \qquad (35)$$

$$\sum_{i,j,k=1}^{P} T_{mc\varepsilon}(t, \tau_1, \tau_2)[i, j, k] a_i [a_j \otimes a^\varepsilon_k]^{\varepsilon T}$$

where $T_{mc\varepsilon}(t, \tau_1, \tau_2)$ is the matrix $(P \times P^2)$ whose coefficients are the quantities $T_{mc\varepsilon}(t, \tau_1, \tau_2)[i, j, k]$ defined by $$T_{mc\varepsilon}(t, \tau_1, \tau_2)[i, j, k] = E[m_{ic}(t) m_{jc}(t-\tau_1)^\varepsilon m_{kc}(t-\tau_2)] = \qquad (36)$$
$$E[\Delta m_{ic}(t) m_{ic}(t-\tau_1)^\varepsilon \Delta m_{ic}(t-\tau_2)] \delta(i-j) \delta(i-k) +$$
$$e_{ic}(t) E[\Delta m_{jc}(t-\tau_1)^\varepsilon \Delta m_{jc}(t-\tau_2)] \delta(j-k) +$$
$$e_{kc}(t-\tau_2) E[\Delta m_{ic}(t) \Delta m_{ic}(t-\tau_1)^\varepsilon] \delta(i-j) +$$
$$e_{jc}(t-\tau_1)^\varepsilon E[\Delta m_{ic}(t) \Delta m_{ic}(t-\tau_2)] \delta(i-k) +$$
$$4 e_{ic}(t) e_{jc}(t-\tau_1)^\varepsilon e_{kc}(t-\tau_2)$$

For cyclostationary sources, the matrices of third-order moments, $T_{mc\varepsilon}(t, \tau_1, \tau_2)$ and $T_{x\varepsilon}(t, \tau_1, \tau_2)$, are (quasi-) or poly-periodic functions of the time t accepting a Fourier series decomposition and we get:

$$T_{x\varepsilon}(t, \tau_1, \tau_2) = \sum_{v_{x\varepsilon} \in \Gamma^{[1,\varepsilon 1]}_x} T^{v_{x\varepsilon}}_{x\varepsilon}(\tau_1, \tau_2) e^{j2\pi v_{x\varepsilon} t} \qquad (37)$$

where $$\Gamma^{[1,\varepsilon 1]}_x = \{v_{x\varepsilon}\}$$

is the set of the cyclic frequencies $v_{x\varepsilon}$ of $T_{x\varepsilon}(t, \tau_1, \tau_2)$ and $$T^{v_{x\varepsilon}}_{x\varepsilon}(\tau_1, \tau_2)$$

a matrix of cyclic third-order moments of x(t), defined respectively by $$T_{x\varepsilon}^{\nu_{x\varepsilon}}(\tau_1, \tau_2) = \langle T_{x\varepsilon}(t, \tau_1, \tau_2)e^{-j2\pi\nu_{x\varepsilon}t}\rangle_c = \quad (38)$$
$$AT_{mc\varepsilon}^{\nu_{x\varepsilon}}(\tau_1, \tau_2)(A \otimes A^\varepsilon)^{\varepsilon T}$$

where $\otimes$ corresponds to the Kronecker product.

Fourth-Order Statistics

Based on the above assumptions (relating to non-centered and cyclostationary signals) the fourth-order statistics of the observations are the fourth-order cumulants defined by:

$$Qx\zeta(t, \tau_1, \tau_2, \tau_3)[i, j, k, l] \triangleq \quad (39)$$
$$\mathrm{Cum}(x_i(t), x_j(t-\tau_1)^{\zeta_1}, x_k(t-\tau_2)^{\zeta_2}, x_l(t-\tau_3)) =$$
$$\mathrm{Cum}(\Delta x_i(t), \Delta x_j(t-\tau_1)^{\zeta_1}, \Delta x_k(t-\tau_2)^{\zeta_2}, \Delta x_l(t-\tau_3)) =$$
$$E[\Delta x_i(t)\Delta x_j(t-\tau_1)^{\zeta_1}\Delta x_k(t-\tau_2)^{\zeta_2}\Delta x_l(t-\tau_3)] -$$
$$E[\Delta x_i(t)\Delta x_j(t-\tau_1)^{\zeta_1}]E[\Delta x_k(t-\tau_2)^{\zeta_2}\Delta x_l(t-\tau_3)] -$$
$$E[\Delta x_i(t)\Delta x_k(t-\tau_2)^{\zeta_2}]E[\Delta x_j(t-\tau_1)^{\zeta_1}\Delta x_l(t-\tau_3)] -$$
$$E[\Delta x_i(t)\Delta x_l(t-\tau_3)]E[\Delta x_j(t-\tau_1)^{\zeta_1}\Delta x_k(t-\tau_2)^{\zeta_2}] =$$
$$E[x_i(t)x_j(t-\tau_1)^{\zeta_1}x_k(t-\tau_2)^{\zeta_2}x_l(t-\tau_3)] -$$
$$e_{xi}(t)E[x_j(t-\tau_1)^{\zeta_1}x_k(t-\tau_2)^{\zeta_2}x_l(t-\tau_3)] -$$
$$e_{xj}(t-\tau_1)^{\zeta_1}E[x_i(t)x_k(t-\tau_2)^{\zeta_2}x_l(t-\tau_3)] -$$
$$e_{xk}(t-\tau_2)^{\zeta_2}E[x_i(t)x_j(t-\tau_1)^{\zeta_1}x_l(t-\tau_3)] -$$
$$e_{xl}(t-\tau_3)E[x_i(t)x_j(t-\tau_1)^{\zeta_1}x_k(t-\tau_2)^{\zeta_2}] -$$
$$E[x_i(t)x_j(t-\tau_1)^{\zeta_1}]E[x_k(t-\tau_2)^{\zeta_2}x_l(t-\tau_3)] -$$
$$E[x_i(t)x_k(t-\tau_2)^{\zeta_2}]E[x_j(t-\tau_1)^{\zeta_1}x_l(t-\tau_3)] -$$
$$E[x_i(t)x_l(t-\tau_3)]E[x_j(t-\tau_1)^{\zeta_1}x_k(t-\tau_2)^{\zeta_2}] + 2e_{xi}(t)$$
$$e_{xj}(t-\tau_1)^{\zeta_1}E[x_k(t-\tau_2)^{\zeta_2}x_l(t-\tau_3)] +$$
$$2e_{xi}(t)e_{xk}(t-\tau_2)^{\zeta_2}E[x_j(t-\tau_1)^{\zeta_1}x_l(t-\tau_3)] +$$
$$2e_{xi}(t)e_{xl}(t-\tau_3)E[x_j(t-\tau_1)^{\zeta_1}x_k + (t-\tau_2)^{\zeta_2}] +$$
$$2e_{xk}(t-\tau_2)^{\zeta_2}e_{xj}(t-\tau_1)^{\zeta_1}E[x_i(t)x_l(t-\tau_3)] +$$
$$2e_{xl}(t-\tau_3)e_{xj}(t-\tau_1)^{\zeta_1}E[x_k(t-\tau_2)^{\zeta_2}x_i(t)] +$$
$$2e_{xk}(t-\tau_2)^{\zeta_2}e_{xl}(t-\tau_3)E[x_i(t)x_j(t-\tau_1)^{\zeta_1}] -$$
$$6e_{xi}(t)e_{xj}(t-\tau_1)^{\zeta_1}e_{xk}(t-\tau_2)^{\zeta_2}e_{xl}(t-\tau_3)$$

where $\zeta \triangleq (\zeta_1, \zeta_2)$ and $(\zeta_1, \zeta_2) = (1, 1), (-1, 1)$ or $(-1, -1)$. Assuming that the term $Q_{x\zeta}(t, \tau_1, \tau_2, \tau_3)[i, j, k, l]$ is the element $[N(i-1)+j, N(k-1)+l]$ of the matrix $Q_{x\zeta}(t, \tau_1, \tau_2, \tau_3)$, known as the quadricovariance matrix, with a dimension $(N^2 \times N^2)$, we obtain an expression of this dimension given by:

$$Q_{x\zeta}(t, \tau_1, \tau_2, \tau_3) = (A \otimes A^{\zeta_1})Q_{mc\zeta}(t, \tau_1, \tau_2, \tau_3)(A^{\zeta_2} \otimes A)^T = \quad (40)$$
$$\sum_{i,j,k=1} Q_{mc\zeta}[i, j, k, l](t, \tau_1, \tau_2, \tau_3)[a_i \otimes a_j^{\zeta_1}][a_k^{\zeta_2} \otimes a_l]^T$$

where $Q_{mc\zeta}(t, \tau_1, \tau_2, \tau_3)$ is the quadricovariance of the vector $m_c(t)$ whose elements are $Q_{mc\zeta}[i, j, k, l](t, \tau_1, \tau_2, \tau_3) \triangleq \mathrm{Cum}(m_{ic}(t), m_{jc}(t-\tau_1)^{\zeta_1}, m_{kc}(t-\tau_2)^{\zeta_2}, m_{lc}(t-\tau_3))$.

For cyclostationary sources, the matrices of quadricovariance, $Q_{mc\zeta}(t, \tau_1, \tau_2, \tau_3)$ and $Q_{x\zeta}(t, \tau_1, \tau_2, \tau_3)$, are (quasi-) or poly-periodic functions of the time t accepting a Fourier series decomposition, and we obtain $$Q_{x\zeta}(t, \tau_1, \tau_2, \tau_3) = \sum_{\beta_{x\zeta} \in \Gamma_x^{[1,\zeta_1,\zeta_2,1]}} Q_{x\zeta}^{\beta_{x\zeta}}(\tau_1, \tau_2, \tau_3)e^{j2\pi\beta_{x\zeta}t} \quad (41)$$

where $$\Gamma_x^{[1,\zeta_1,\zeta_2,1]} = \{\beta_{x\zeta}\}$$

is the set of cyclic frequencies $\beta_{x\zeta}$ of $Q_{x\zeta}(t, \tau_1, \tau_2, \tau_3)$ and $$Q_{x\zeta}^{\beta_{x\zeta}}(\tau_1, \tau_2, \tau_3)$$

is a matrix of cyclic quadricovariance of x(t), defined respectively by $$Q_{x\zeta}^{\beta_{x\zeta}}(\tau_1, \tau_2, \tau_3) = \langle Q_{x\zeta}(t, \tau_1, \tau_2, \tau_3)e^{-j2\pi\beta_{x\zeta}t}\rangle_c = \quad (42)$$
$$(A \otimes A^{\zeta_1})Q_{mc}^{\beta_x}(\tau_1, \tau_2, \tau_3)(A^{\zeta_2} \otimes A)^T$$

In particular, the cyclic quadricovariance for the zero cyclic frequency corresponds to the temporal mean in t, $Q_{x\zeta}(\tau_1, \tau_2, \tau_3)$, de $Q_{x\zeta}(t, \tau_1, \tau_2, \tau_3)$, which is written as follows:

$$Q_{x\zeta}(\tau_1, \tau_2, \tau_3) \triangleq \langle Q_{x\zeta}(t, \tau_1, \tau_2, \tau_3)\rangle_c = (A \otimes A^{\zeta_1})Q_{mc\zeta}(\tau_1, \tau_2, \tau_3)(A^{\zeta_2} \otimes A)^T \quad (42b)$$

where $Q_{mc\zeta}(\tau_1, \tau_2, \tau_3)$ is the temporal mean in t of $Q_{mc\zeta}(t, \tau_1, \tau_2, \tau_3)$.

Novel Estimator of the Fourth-Order Cumulants of the Observations

From (39) and from the Fourier series decomposition of the statistics appearing in this expression, we deduce the expression of the element [i, j, k, l] of the matrix of cyclic quadricovariance $$Q_{x\zeta}^{\beta}(\tau_1, \tau_2, \tau_3)$$

in the general case of non-centered observations, given by:

$$M_{x\zeta}^{\beta}(\tau_1, \tau_2, \tau_3)[i, j, k, l] = \sum_{\gamma \in \Gamma_x^1} \{ e_x^{\gamma}[i] T_{x\zeta}^{\beta-\gamma}(\tau_1 - \tau_3, \tau_2 - \tau_3)[l, j, k] e^{-j2\pi(\beta-\gamma)\tau_3} + \quad (43)$$

$$e_x^{\gamma}[j]^{\zeta 1} T_{x\zeta 2}^{\beta-\gamma\zeta 1}(\tau_2, \tau_3)[i, k, l] e^{-j2\pi\gamma\zeta 1 \tau_1} +$$

$$e_x^{\gamma}[k]^{\zeta 2} \widehat{T_{x\zeta 1}^{\beta-\gamma\zeta 2}}(\tau_1, \tau_3)[i, j, l] e^{-j2\pi\gamma\zeta 2 \tau_2} +$$

$$e_x^{\gamma}[l] \widehat{T_{x\zeta}^{\beta-\gamma}}(\tau_1, \tau_2)[i, j, k] e^{-j2\pi\gamma\tau_3} \} -$$

$$\sum_{\alpha \in \Gamma_x^{[1,\varepsilon 1]}} R_{x\zeta 1}^{\alpha}(\tau_1)[i, j] R_{x\zeta 2}^{\zeta 2(\beta-\alpha)}(\tau_3 - \tau_2)[k, l]^{\zeta 2} e^{j2\pi(\alpha-\beta)\tau_2} -$$

$$\sum_{\gamma \in \Gamma_x^{[1,\varepsilon 2]}} R_{x\zeta 2}^{\gamma}(\tau_2)[i, k] R_{x\zeta 1}^{\zeta 1(\beta-\gamma)}(\tau_3 - \tau_1)[j, l]^{\zeta 1} e^{j2\pi(\gamma-\beta)\tau_1} -$$

$$\sum_{\omega \in \Gamma_x^{[1,1]}} R_{x\zeta 1}^{\omega}(\tau_3)[i, l] R_{x\zeta 1 2}^{\zeta 1(\beta-\omega)}(\tau_2 - \tau_1)[j, k]^{\zeta 1} e^{j2\pi(\omega-\beta)\tau_1} +$$

$$2 \sum_{\gamma \in \Gamma_x^1} \sum_{\omega \in \Gamma_x^1} \{ e_x^{\gamma}[i] e_x^{\omega}[j]^{\zeta 1} R_{x\zeta 2}^{\beta-\gamma-\omega\zeta 1}(\tau_2 - \tau_3)[l, k] e^{j2\pi\omega\zeta 1(\tau_3 - \tau_1)} e^{j2\pi(\gamma-\beta)\tau_3} +$$

$$e_x^{\gamma}[i] e_x^{\omega}[k]^{\zeta 2} R_{x\zeta 1}^{\beta-\gamma-\omega\zeta 2}(\tau_1 - \tau_3)[l, j] e^{j2\pi\omega\zeta 2(\tau_3 - \tau_2)} e^{j2\pi(\gamma-\beta)\tau_3} +$$

$$e_x^{\gamma}[i] e_x^{\omega}[l] R_{x\zeta 1 2}^{\zeta 1(\beta-\gamma-\omega)}(\tau_2 - \tau_1)[j, k]^{\zeta 1} e^{j2\pi\omega(\tau_1 - \tau_3)} e^{-j2\pi\beta\tau_1} +$$

$$e_x^{\gamma}[k]^{\zeta 2} e_x^{\omega}[j]^{\zeta 1} R_{xj}^{\beta-\gamma\zeta 2-\omega\zeta 1}(\tau_3)[i, l] e^{-j2\pi\gamma\tau_2\zeta 2} e^{-j2\pi\omega\tau_1\zeta 1} +$$

$$e_x^{\gamma}[l] e_x^{\omega}[j]^{\zeta 1} R_{x\zeta 2}^{\beta-\gamma-\omega\zeta 1}(\tau_2)[i, k] e^{-j2\pi\omega\tau_1\zeta 1} e^{-j2\pi\gamma\tau_3} +$$

$$e_x^{\gamma}[l] e_x^{\omega}[k]^{\zeta 2} R_{x\zeta 1}^{\beta-\gamma-\omega\zeta 2}(\tau_1)[i, j] e^{-j2\pi\omega\tau_2\zeta 2} e^{-j2\pi\gamma\tau_3} \} -$$

$$6 \sum_{\gamma \in \Gamma_x^1} \sum_{\omega \in \Gamma_x^1} \sum_{\delta \in \Gamma_x^1} e_x^{\gamma}[i] e_x^{\omega}[j]^{\zeta 1} e_x^{\delta}[k]^{\zeta 2} e_x^{\beta-\omega\zeta 1-\delta\zeta 2}[l] e^{j2\pi\omega\zeta 1(\tau_3 - \tau_1)} e^{j2\pi\delta\zeta 2(\tau_3 - \tau_2)}$$
$$e^{j2\pi\tau_3(\gamma-\beta)}$$

where $T_{x\zeta}(t, \tau_1, \tau_2)[i, j, k] \triangleq E[x_i(t) x_j(t - \tau_1)^{\zeta 1} x_k(t - \tau_2)^{\zeta 2}]$, $T_{x\zeta}^{\beta}(\tau_1, \tau_2)[i, j, k] \triangleq \langle T_{x\zeta}(t, \tau_1, \tau_2)[i, j, k] e^{-j2\pi\beta t} \rangle_c$, $T_{x\varepsilon}(t, \tau_1, \tau_2)[i, j, k] \triangleq E[x_i(t) x_j(t - \tau_1)^{\varepsilon} x_k(t - \tau_2)]$, $T_{x\varepsilon}^{\beta}(\tau_1, \tau_2)[i, j, k] = \langle T_{x\varepsilon}(t, \tau_1, \tau_2)[i, j, k] e^{-j2\pi\beta t} \rangle_c$ In particular, the matrix of cyclic quadricovariance exploited by the separators of the family F3 corresponds to the matrix $Q_{x\zeta}^{\beta}(\tau_1, \tau_2, \tau_3)$ for $\beta=0$, $\zeta=(-1, -1)$ and $(\tau_1, \tau_2, \tau_3)=(0, 0, 0)$ and its element $Q_{x\zeta}^{\beta}(\tau_1, \tau_2, \tau_3)[i, j, k, l]$, denoted as $Q_x[i, j, k, l]$, is written:

$$Q_x[i, j, k, l] \triangleq \langle Q_x(t, 0, 0, 0)[i, j, k, l] \rangle_c = M_x^0[i, j, k, l] - \quad (44)$$

$$\sum_{\gamma \in \Gamma_x^1} \{ e_x^{\gamma}[i] T_x^{\gamma}[j, l, k]^* + e_x^{\gamma}[l] T_x^{\gamma}[j, i, k]^* + e_x^{\gamma}[j]^* T_x^{\gamma}[i, k, l]^* + e_x^{\gamma}[k]^* T_x^{\gamma}[i, j, l] \} -$$

-continued $$\sum_{\alpha \in \Gamma_x^{[1,-1]}} \{R_x^\alpha[i,j]R_x^{-\alpha}[l,k] + R_x^\alpha[i,k]R_x^{-\alpha}[l,j]\} - \sum_{\omega \in \Gamma_x^{[1,1]}} C_x^\omega[i,l]C_x^\omega[j,k]^* +$$

$$2 \sum_{\gamma \in \Gamma_x^1} \sum_{\omega \in \Gamma_x^1} \{e_x^\gamma[i]e_x^\omega[j]^* R_x^{\omega-\gamma}[l,k] + e_x^\gamma[i]e_x^\omega[k]^* R_x^{\omega-\gamma}[l,j] + e_x^\gamma[i]e_x^\omega[l]C_x^{\omega+\gamma}[k,j]^* +$$

$$e_x^\gamma[k]^* e_x^\omega[j]^* C_x^{\omega+\gamma}[i,l] + e_x^\gamma[l]e_x^\omega[j]^* R_x^{\omega-\gamma}[i,k] + e_x^\gamma[l]e_x^\omega[k]^* R_x^{\omega-\gamma}[i,j]\} -$$

$$6 \sum_{\gamma \in \Gamma_x^1} \sum_{\omega \in \Gamma_x^1} \sum_{\delta \in \Gamma_x^1} e_x^\gamma[i]e_x^\omega[j]^* e_x^\delta[k]^* e_x^{\delta+\omega-\gamma}[l]$$

where $M_x^0[i,j,k,l] \triangleq <E[x_i(t)x_j(t)^* x_k(t)^* x_l(t)]>_c$, $T_x^\beta[i,j,k] \triangleq <E[x_i(t)x_j(t)^* x_k(t)]e^{-j2\pi\beta t}>_c$, $R_x^\alpha[i,j] \triangleq <E[x_i(t)x_j(t)^*]e^{-j2\pi\alpha t}>_c$, $C_x^\alpha[i,j] \triangleq <E[x_i(t)x_j(t)]e^{-j2\pi\alpha t}>_c$.

Thus, the estimation of the matrix of cyclic quadricovariance $Q_{x\zeta}^\beta(l_1 T_e, l_2 T_e, l_3 T_e)[i,j,k,l]$ is made on the basis of the estimator $\hat{Q}_{x}^\beta \zeta(l_1 T_e, l_2 T_e, l_3 T_e)[i,j,k,l](K)$ defined by:

$$\hat{Q}_{x\zeta}^\beta(l_1 T_e, l_2 T_e, l_3 T_e)[i,j,k,l](K) = \hat{M}_{x\zeta}^\beta(l_1 T_e, l_2 T_e, l_3 T_e)[i,j,k,l](K) - \quad (45)$$

$$\sum_{\gamma \in \Gamma_x^1} \{\hat{e}_x^\gamma[i](K)\hat{T}_{x\zeta}^{\beta-\gamma}((l_1-l_3)T_e, (l_2-l_3)T_e)[l,j,k](K)e^{-j2\pi(\beta-\gamma)l_3 T_e} +$$

$$\hat{e}_x^\gamma[j](K)^{\zeta 1}\hat{T}_{x\zeta 2}^{\beta-\gamma\zeta 1}(l_2 T_e, l_3 T_e)[i,k,l](K)e^{-j2\pi\gamma\zeta 2 l_1 T_e} +$$

$$\hat{e}_x^\gamma[k](K)^{\zeta 2}\hat{T}_{x\zeta 2}^{\beta-\gamma\zeta 2}(l_1 T_e, l_3 T_e)[i,j,l](K)e^{-j2\pi\gamma\zeta 2 l_2 T_e} +$$

$$\hat{e}_x^\gamma[l](K)\hat{T}_{x\zeta}^{\beta-\gamma}(l_1 T_e, l_2 T_e)[i,j,k](K)e^{-j2\pi\gamma l_3 T_e}\} -$$

$$\sum_{\alpha \in \Gamma_x^{[1,\varepsilon 1]}} \hat{R}_{x\zeta 1}^\alpha(l_1 T_e)[i,j](K)\hat{R}_{x\zeta 2}^{\zeta 2(\beta-\alpha)}((l_3-l_2)T_e)[k,l](K)^{\zeta 2}e^{j2\pi(\alpha-\beta)l_2 T_e} -$$

$$\sum_{\gamma \in \Gamma_x^{[1,\varepsilon 2]}} \hat{R}_{x\zeta 2}^\gamma(l_2 T_e)[i,k](K)\hat{R}_{x\zeta 1}^{\zeta 1(\beta-\gamma)}((l_3-l_1)T_e)[j,l](K)^{\zeta 1}e^{j2\pi(\gamma-\beta)l_1 T_e} -$$

$$\sum_{\omega \in \Gamma_x^{[1,1]}} \hat{R}_{x\zeta 1}^\omega(l_3 T_e)[i,l](K)\hat{R}_{x\zeta 2}^{\zeta 1(\beta-\omega)}((l_2-l_1)T_e)[j,k](K)^{\zeta 1}e^{j2\pi(\omega-\beta)l_1 T_e} +$$

$$2 \sum_{\gamma \in \Gamma_x^1} \sum_{\omega \in \Gamma_x^1} \{\hat{e}_x^\gamma[i](K)\hat{e}_x^\omega[j](K)^{\zeta 1}\hat{R}_{x\zeta 2}^{\beta-\gamma-\omega\zeta 1}((l_2-l_3)T_e)[l,k](K)e^{j2\pi\omega\zeta_1(l_3-l_1)T_e}e^{j2\pi(\gamma-\beta)l_3 T_e} +$$

$$\hat{e}_x^\gamma[i](K)\hat{e}_x^\omega[k](K)^{\zeta 2}\hat{R}_{x\zeta 1}^{\beta-\gamma-\omega\zeta 2}((l_1-l_3)T_e)[l,j](K)e^{j2\pi\omega\zeta 2(l_3-l_2)T_e}e^{j2\pi(\gamma-\beta)l_3 T_e} +$$

$$\hat{e}_x^\gamma[i](K)\hat{e}_x^\omega[l](K)\hat{R}_{x\zeta 2}^{\zeta 1(\beta-\omega-\gamma)}((l_2-l_1)T_e)[j,k](K)^{\zeta 1}e^{j2\pi\omega(l_1-l_3)T_e}e^{-j2\pi\beta l_1 T_e} +$$

-continued $$\hat{e}_x^\gamma[k](K)^{\zeta 2}\hat{e}_x^\omega[j](K)^{\zeta 1}\hat{R}_{x_{\zeta 1}}^{\beta-\gamma\zeta 2-\omega\zeta 1}(l_3T_e)[i,l](K)e^{-j2\pi\gamma l_2 T_e \zeta 2}e^{-j2\pi\omega l_1 T_e \zeta 1} +$$

$$\hat{e}_x^\gamma[l](K)\hat{e}_x^\omega[j](K)^{\zeta 1}\hat{R}_{x_{\zeta 2}}^{\beta-\gamma-\omega\zeta 1}(l_2T_e)[i,k](K)e^{-j2\pi\gamma l_1 T_e \zeta 1}e^{-j2\pi\gamma l_3 T_e} +$$

$$\hat{e}_x^\gamma[l](K)\hat{e}_x^\omega[k](K)^{\zeta 2}\hat{R}_{x_{\zeta 1}}^{\beta-\gamma-\omega\zeta 2}(l_1T_e)[i,j](K)e^{-j2\pi\omega l_2 T_e \zeta 2}e^{-j2\pi\gamma l_3 T_e} \Big\} -$$

$$6\sum_{\gamma\in\Gamma_x^1}\sum_{\omega\in\Gamma_x^1}\sum_{\delta\in\Gamma_x^1}\hat{e}_x^\gamma[i](K)\hat{e}_x^\omega[j](K)^{\zeta 1}\hat{e}_x^\delta[k](K)^{\zeta 2}\hat{e}_x^{\beta-\gamma-\omega\zeta 1-\delta\zeta 2}[l](K)e^{j2\pi\omega\zeta 1(l_3-l_1)T_e}e^{j2\pi\delta\zeta 2(l_3-l_2)T_e}e^{j2\pi l_3 T_e(\gamma-\beta)}$$

where $$\hat{M}_{x\zeta}^\beta(l_1T_e, l_2T_e, l_3T_e)[i,j,k,l](K)$$

is defined by the expression:

$$\hat{M}_{x\zeta}^\beta(l_1T_e, l_2T_e, l_3T_e)[i,j,k,l](K) = \quad (46)$$
$$\frac{1}{K}\sum_{m=1}^K x_i(m)x_j(m-l_1)^{\zeta 1}x_k(m-l_2)^{\zeta 2}x_l(m-l_3)e^{-j2\pi\beta mT_e}$$

given in the reference [5] and where $$\hat{e}_x^\gamma[i](K),\ \hat{R}_{x\varepsilon}^\alpha(lT_e)[i,j](K),$$
$$\hat{T}_{x\varepsilon}^\alpha(l_1T_e, l_2T_e)[i,j,l](K) \text{ and } \hat{T}_{x\zeta}^\alpha(l_1T_e, l_2T_e)[i,j,l](K)$$

are defined respectively by (47), (48), (49) and (50).

$$\hat{e}_x^\gamma[i](K) \triangleq \frac{1}{K}\sum_{k=1}^K x_i(k)e^{-j2\pi\gamma kT_e} \quad (47)$$

$$\hat{R}_{x\varepsilon}^\alpha(lT_e)[i,j](K) \triangleq \frac{1}{K}\sum_{k=1}^K x_i(k)x_j(k-l)^\varepsilon e^{-j2\pi\alpha kT_e} \quad (48)$$

$$\hat{T}_{x\varepsilon}^\alpha(l_1T_e, l_2T_e)[i,j,l](K) \triangleq \frac{1}{K}\sum_{k=1}^K x_i(k)x_j(k-l_1)^\varepsilon x_l(k-l_2)e^{-j2\pi\alpha kT_e} \quad (49)$$

$$\hat{T}_{x\zeta}^\alpha(l_1T_e, l_2T_e)[i,j,l](K) \triangleq \frac{1}{K}\sum_{k=1}^K x_i(k)x_j(k-l_1)^{\zeta 1}x_l(k-l_2)^{\zeta 2}e^{-j2\pi\alpha kT_e} \quad (50)$$

Thus, assuming cyclostationary and cycloergodic observations, centered or non-centered, the estimator (45) is an asymptotically unbiased and consistent estimator of the element $$Q_{x\zeta}^\beta(l_1T_e, l_2T_e, l_3T_e)[i,j,k,l].$$

In particular, the separators F3 must exploit the estimator (45) for $\beta=0$, $\zeta=(-1,-1)$ and $l_1=l_2=l_3=0$, denoted $\hat{Q}_x[i,j,k,l](K)$ and defined by:

$$\hat{Q}_x[i,j,k,l](K) \triangleq \hat{M}_x^0[i,j,k,l](K) - \quad (51)$$
$$\sum_{\gamma\in\Gamma_x^1}\{\hat{e}_x^\gamma[i](K)\hat{T}_x^\gamma[j,l,k](K)^* + \hat{e}_x^\gamma[l](K)\hat{T}_x^\gamma[j,i,k](K)^* +$$
$$\hat{e}_x^\gamma[j](K)^*\hat{T}_x^\gamma[i,k,l](K) + \hat{e}_x^\gamma[k](K)^*\hat{T}_x^\gamma[i,j,l](K)\} -$$
$$\sum_{\omega\in\Gamma_x^{[1,1]}}\hat{C}_x^\omega[i,l](K)\hat{C}_x^\omega[j,k](K)^* -$$
$$\sum_{\alpha\in\Gamma_x^{[1,-1]}}\{\hat{R}_x^\alpha[i,j](K)\hat{R}_x^{-\alpha}[l,k](K) + \hat{R}_x^\alpha[i,k](K)\hat{R}_x^{-\alpha}[l,j](K)\} +$$
$$2\sum_{\gamma\in\Gamma_x^1}\sum_{\omega\in\Gamma_x^1}\{\hat{e}_x^\gamma[i](K)\hat{e}_x^\omega[j](K)^*\hat{R}_x^{\omega-\gamma}[l,k](K) + \hat{e}_x^\gamma[i](K)\hat{e}_x^\omega[k](K)^*$$
$$\hat{R}_x^{\omega-\gamma}[l,j](K) + \hat{e}_x^\gamma[i](K)\hat{e}_x^\omega[l](K)\hat{C}_x^{\omega+\gamma}[k,j](K)^* +$$
$$\hat{e}_x^\gamma[k](K)^*\hat{e}_x^\omega[j](K)^*\hat{C}_x^{\omega+\gamma}[i,l](K) + \hat{e}_x^\gamma[l](K)\hat{e}_x^\omega[j](K)^*$$
$$\hat{R}_x^{\omega-\gamma}[i,k](K) + \hat{e}_x^\gamma[l](K)\hat{e}_x^\omega[k](K)^*\hat{R}_x^{\omega-\gamma}[i,j](K)\} -$$
$$6\sum_{\gamma\in\Gamma_x^1}\sum_{\omega\in\Gamma_x^1}\sum_{\delta\in\Gamma_x^1}\hat{e}_x^\gamma[i](K)\hat{e}_x^\omega[j](K)^*\hat{e}_x^\delta[k](K)^*\hat{e}_x^{\delta+\omega-\gamma}[l](K)$$

where $\hat{M}_x^0[i,j,k,l](K)$ is defined by (46) (defined here above) with $\beta=0$, $l_1=l_2=l_3=0$, $\zeta=(-1,-1)$, $\hat{T}_x^\gamma[i,j,l](K)$ is defined by (49) with $\alpha=\gamma$, $l_1=l_2=0$, $\varepsilon=-1$, $\hat{R}_x^\alpha[i,j]$ and $\hat{C}_x^\alpha[i,j]$ are defined by (29) with $l=0$ and respectively $\varepsilon=-1$ and $\varepsilon=+1$.

As indicated here above and as can be seen from the previous estimators, the method according the invention also comprises a step in which the second-order estimator is corrected by using cyclic frequencies which have to be detected a priori. The following detailed example is given in the case of a detection of the first-order cyclic frequencies.

Detector of the First-Order Cyclic Frequencies

The detection of the first-order cyclic frequencies of the observations γ by a detector of cyclic frequencies and the constitution of an estimate, $\hat{f}_x^1$, of the set, $\hat{\Gamma}_x^1$, of the cyclic frequencies γ are done, for example, by computing the following standardized criterion:

$$V(\alpha) = \frac{\frac{1}{N}\sum_{n=1}^{N}|\hat{e}_x^\alpha[n][K]|^2}{\hat{\overline{\gamma}}_x} \quad (52)$$

With $\hat{\overline{\gamma}}_x = \frac{1}{N}\frac{1}{K}\sum_{k=1}^{K}|x_n(k)|^2$ and $\hat{e}_x^\gamma[n](K) = \frac{1}{K}\sum_{k=1}^{K}x_n(k)\exp(-j2\pi\gamma kT_e)$ It may be recalled that $x_n(t)$ is the signal received at the $n^{th}$ sensor. The estimator $\hat{e}_x^\gamma[n](K)$ may be computed in an optimized way for K cyclic frequencies $\alpha_k = k/(KT_e)$ ($0 \leq k \leq K-1$) by an FFT (a Fast Fourier Transformation) on the temporal samples $x_n((k+k_0)T_e)$ such that $0 \leq k \leq K-1$. The criterion $V(\alpha)$ is standardized between 0 and 1 because $\overline{\gamma}_x$ represents the temporal mean of the mean power of the signal on the set of sensors. It being known that, on the assumption that $x_n(kT_e)$ is a Gaussian noise, the criterion $V(\alpha)$ approximately follows a chi-2 relationship, the following detection test is deduced therefrom:

The frequency α is a cyclic frequency $\gamma_n$ of E[x(t)]: $V(\alpha) \geq \mu(pf\alpha)$ The frequency α is not a cyclic frequency: $V(\alpha) < \mu(pf\alpha)$ where $\mu(pf\alpha)$ is a threshold as a function of the probability of false alarm pfα

The rest of the description gives several alternative modes of implementation of the method for the separation of statistically independent, stationary or cyclostationary sources. The associated separators are respectively called F'1, F'2, F'3 and F'4.

Proposed Second-Order Separators

Separators F1'

The separators of the family F1' are self-learning second-order separators implementing the following operations:

Whitening Step

The detection of the first-order cyclic frequencies of the observations γ by any detector of cyclic frequencies and the constitution of an estimate, $\hat{f}_x^1$, of the set, $\hat{\Gamma}_x^1$, of the cyclic frequencies γ.

The estimation of the matrix $R_{Ax}(0)$ by $\hat{R}_{Ax}(0)(K)$ defined by (33) and (32) for l=0 on the basis of a given number K of samples.

The detection of the number of sources P from the decomposition of $\hat{R}_{Ax}(0)(K)$ into eigen elements. (All the non-deterministic sources are detected).

The computation of the whitening matrix of the observations, $\hat{T}$, where $\hat{T} \triangleq \hat{\Lambda}_s^{-1/2} \hat{U}_s^\dagger$, with a dimension (P×N), where $\hat{\Lambda}_s$ is the diagonal matrix (P×P) of the P greatest eigen values of $\hat{R}_{Ax}(0)(K) - \lambda\min I$, λmin is the minimum eigen value of $\hat{R}_{Ax}(0)(K)$ and $\hat{U}_s$ is the matrix of associated eigen vectors. We write $z(t) \triangleq \hat{T}x(t)$. (The directional vectors of the non-deterministic sources are orthonormalized).

Identification Step

Choice of Q values of non-zero delays, $l_q$, ($1 \leq q \leq Q$).

For each value, $l_q$, of the delay, estimation of the matrix of averaged second-order cumulants of the observations, $R_{Ax}(l_q T_e)$, by $\hat{R}_{Ax}(l_q T_e)(K)$ defined by (33), (29) and (32)

Computation of the matrices $\hat{R}_{Az}(l_q T_e)(K) \triangleq \hat{T}\hat{R}_{Ax}(l_q T_e)(K)\hat{T}^\dagger$ and self-learned identification of the directional vectors of the whitened sources by maximization, with respect to $U \triangleq (u_1, u_2, \ldots u_P)$, of the criterion $$CI(U) \triangleq \sum_{q=1}^{Q}\sum_{l=1}^{P}|u_l^\dagger R_z(\tau_q)u_l|^2$$

given in the reference [7] where $R_z(\tau_q)$ is replaced by $\hat{R}_{Az}(l_q T_e)(K)$. The solution matrix U is denoted $\hat{A}_{nd}'$ and contains an estimate of the whitened directional vectors of the non-deterministic sources.

Filter

The computation of an estimate of the matrix of the directional vectors of the non-deterministic source $\hat{A}_{nd} = \hat{U}_s \hat{\Lambda}_s^{1/2} \hat{A}_{nd}'$ The extraction of the non-deterministic sources by any spatial filtering of the observations constructed on the basis of $\hat{A}_{nd}$.

Processing of the Deterministic Sources

The construction of the orthogonal projector on the space orthogonal to the columns of $\hat{A}_{nd}$: $Proj = I - \hat{A}_{nd}[\hat{A}_{nd}^\dagger \hat{A}_{nd}]^{-1}\hat{A}_{nd}^\dagger$ The implementation of the SOBI algorithm [3] on the basis of the observations $v(t) \triangleq Proj\, x(t)$ to identify the directional vectors of the deterministic sources and extract them.

Separators F2'

The separators of the family F2' are second-order self-learning separators implementing the following operations:

Whitening Step

The detection of the first order cyclic frequencies of the observations γ by any unspecified detector of cyclic frequencies and the constitution of an estimate, $\hat{f}_x^1$, of the set, $\hat{\Gamma}_x^1$, of the cyclic frequencies γ.

The estimation of the matrix $R_{\Delta x}(0)$ by $\hat{R}_{\Delta x}(0)(K)$ defined by (33) and (32) for l=0 from a given number of samples K The detection of the number of sources P from the decomposition into eigen elements of $\hat{R}_{\Delta x}(0)(K)$. (all the non-deterministic sources are detected).

Identification Step

The computation of the whitening matrix of the observations, $\hat{T}$, where $\hat{T} \triangleq \hat{\Lambda}_s^{-1/2} \hat{U}_s^\dagger$, with a dimension (P×N), where $\hat{\Lambda}_s$ is the diagonal matrix (P×P) of the P biggest eigen values of $\hat{R}_{\Delta x}(0)(K)-\lambda \min I$, $\lambda \min$ is the minimal eigen value of $\hat{R}_{\Delta x}(0)(K)$ and $\hat{U}_s$ is the matrix of the associated eigen vectors. We write $z(t) \triangleq \hat{T}x(t)$. (The directional vectors of the non-deterministic sources are orthonormalized).

The detection of the second-order cyclic frequencies of the observations [9], $\alpha_\epsilon$, for $\epsilon=-1$ and $\epsilon=+1$ by any detector of cyclic frequencies and constitution of the estimates, $$\hat{\Gamma}_x^{[1,-1]} \text{ and } \hat{\Gamma}_x^{[1,1]},$$

the sets respectively, $\Gamma_x^{[1,-1]}$ and $\Gamma_x^{[1,1]}$, the cyclic frequencies respectively of the first and second matrices of correlation of the observations.

The choice of an arbitrary number of pairs $(\alpha_m, \epsilon_m)$ $(1 \leq m \leq M)$ such that, for each of these pairs, at least one source possesses the second-order cyclic frequency $\alpha_m$ for a matrix of correlation indexed by $\epsilon_m$.

For each pair $(\alpha_m, \epsilon_m)$, $(1 \leq m \leq M)$:

The choice of an arbitrary number $Q_m$ of delays, $l_{mq}$, $(1 \leq q \leq Q_m)$ For each value of the delay, $l_{mq}$ $(1 \leq q \leq Q_m)$, The estimation of the matrix of second-order cyclic cumulants of the whitened observations, $$R_{\Delta z \epsilon_m}^{\alpha_m}(l_{mq}T_e), \text{ by } \hat{R}_{\Delta z \epsilon_m}^{\alpha_m}(l_{mq}T_e)(K)$$

defined by (31), (29), (32) with the index z instead of x.

The detection of the number of non-deterministic sources $P_{(\alpha m, \epsilon m)}$ having the second-order cyclic frequency $\alpha_m$, for the matrix of correlation indexed by $\epsilon_m$. This detection test may consist of a search for the maximum rank of the signal space of the matrices $\hat{R}_{\Delta z \epsilon}{}^{\alpha m}{}_m(l_{mq}T_e)(K)$. $\hat{U}_{(\alpha m, \epsilon m)}$ denotes the unit matrix (P×P$_{(\alpha m, \epsilon m)}$), obtained by SVD of the previous matrices, whose columns generate the space generated by the whitened directional vectors associated with the sources having the second-order cyclic frequency, $\alpha_m$, for the matrix of correlation indexed by $\epsilon_m$.

Reduction of dimension: We write $v(t) \triangleq \hat{U}_{(\alpha m, \epsilon m)}^\dagger z(t)$, with a dimension (P$_{(\alpha m, \epsilon m)}$×1) and carry out a computation, for each delay $l_{mq}$ $(1 \leq q \leq Q_m)$, of the matrices $$\hat{R}_{\Delta v \epsilon_m}^{\alpha_m}(l_{mq}T_e)(K) = \hat{U}_{(\alpha m, \epsilon m)}^\dagger \hat{R}_{\Delta z \epsilon_m}^{\alpha_m}(l_{mq}T_e)(K) \hat{U}_{(\alpha m, \epsilon m)}^{*\epsilon_m}$$

The self-learned identification of the doubly whitened directional vectors associated with the pair $(\alpha_m, \epsilon_m)$ by maximization in relation to $U \triangleq (u_1, u_2, \ldots, u_{P(\alpha m, \epsilon m)})$, of the criterion $$CI(U) \triangleq \sum_{q=1}^{Q} \sum_{l=1}^{P} |u_l^\dagger R_z(\tau_q) u_l|^2$$

given in the reference [7] where $R_z(\tau_q)$ is replaced by $$\hat{R}_{\Delta v \epsilon_m}^{\alpha_m}(l_{mq}T_e)(K) \hat{R}_{\Delta v \epsilon_m}^{\alpha_m}(l_{mq}T_e)(K)^\dagger.$$

The solution matrix U is written as $\hat{A}_{nd(\alpha m, \epsilon m)}'$ and contains an estimate of the doubly whitened directional vectors of the non-deterministic sources associated with the pair $(\alpha_m, \epsilon_m)$.

Filter

The computation of an estimate of the matrix of the directional vectors of the non-deterministic sources associated with the pair $(\alpha_m, \epsilon_m)$: $\hat{A}_{nd(\alpha m, \epsilon m)} = \hat{U}_s \hat{\Lambda}_s^{1/2} \hat{U}_{(\alpha m, \epsilon m)} \hat{A}_{nd(\alpha m, \epsilon m)}'$ The concatenation of the matrices $\hat{A}_{nd(\alpha m, \epsilon m)}$ for all the pairs $(\alpha_m, \epsilon_m)$, $(1 \leq m \leq M)$. We obtain the matrix (N×P) of $\hat{A}_{nd}$ of the directional vectors of the non-deterministic sources.

The extraction of the non-deterministic sources by any spatial filtering of the observations constructed from $\hat{A}_{nd}$.

Processing of the Deterministic Sources

The construction of the orthogonal projector on the space orthogonal to the columns of $\hat{A}_{nd}$: $Proj = I - \hat{A}_{nd} [\hat{A}_{nd}^\dagger \hat{A}_{nd}]^{-1} \hat{A}_{nd}^\dagger$ The implementation of the SOBI algorithm [3] from the observations $w(t) \triangleq Proj\, x(t)$ to identify the directional vectors of the deterministic sources and extract them.

Proposed Fourth-Order Separators

Separators F3'

The separators of the family F3' are fourth-order self-learning separators implementing the following operations:

Whitening Step

The detection of the first-order cyclic frequencies of the observations $\gamma$ by any detector of cyclic frequencies and the constitution of an estimate, $$\hat{\Gamma}_x^1,$$

of the set, $$\Gamma_x^1,$$

of the cyclic frequencies $\gamma$.

The detection of the second-order cyclic frequencies of the observations, $\alpha_\epsilon$, for $\epsilon=-1$ and $\epsilon=+1$ by any detector of cyclic frequencies and the constitution of the estimates, $f_x^{[1,-1]}$ and $f_x^{[1,1]}$, of the sets respectively,
$\Gamma_x^{[1,-1]}$ and $f_x^{[1,1]}$, of the cyclic frequencies respectively of the first and second matrices of correlation of the observations.

The estimation of the matrix $R_{\Delta x}(0)$ by $\hat{R}_{\Delta x}(0)(K)$ defined by (53) and (52) for l=0 from a given number of samples K The detection of the number of sources P from the decomposition of $\hat{R}_{\Delta x}(0)(K)$ into eigen elements. (All the non-deterministic sources are detected).

The computation of the whitening matrix of the observations, $\hat{T}$, where $\hat{T} \triangleq \hat{\Lambda}_s^{-1/2} \hat{U}_s^\dagger$, with a dimension (P×N), where $\hat{\Lambda}_s$ is the diagonal matrix (P×P) of the P greatest eigen values of $\hat{R}_{\Delta x}(0)(K) - \lambda\min I$, $\lambda\min$ is the minimum eigen value of $\hat{R}_{\Delta x}(0)(K)$ and $\hat{U}_s$ is the matrix of associated eigen vectors. We write $z(t) \triangleq \hat{T}x(t)$. (The directional vectors of the non-deterministic sources are orthonormalized).

Identification Step

The estimation of the quadricovariance, $Q_z$, of the vector $z(t)$ by the expressions (51), (29), (49), (2) and (32) with the index z instead of x.

The decomposition into eigen elements of $\hat{Q}_z$ and the estimation of the P eigen matrices $M_{zi}$ (1≤i≤P) associated with the P eigen values of higher-value moduli.

The joint diagonalization of the P eigen matrices $M_{zi}$ weighted by the associated eigen values and the obtaining of the matrix of the whitened directional vectors of the non-deterministic sources $\hat{A}_{nd}'$.

Filter

The computation of an estimate of the matrix of the directional vectors of the non-deterministic sources $\hat{A}_{nd} = \hat{U}_s \hat{\Lambda}_s^{1/2} \hat{A}_{nd}'$ The extraction of the non-deterministic sources by any spatial filtering of the observations constructed from $\hat{A}_{nd}$.

Processing of the Deterministic Sources

The construction of the orthogonal projector on the space orthogonal to the columns of $\hat{A}_{nd}$: Proj=I−$\hat{A}_{nd}$ $[\hat{A}_{nd}^\dagger \hat{A}_{nd}]^{-1} \hat{A}_{nd}^\dagger$ The implementation of the algorithm JADE [4] from the observations $v(t) \triangleq \text{Proj } x(t)$ to identify the directional vectors of the deterministic sources and extract them.

Separators F4'

The separators of the family F4' are fourth-order self-learning separators associated with the reference [8] implementing the following operations:

Whitening Step

The detection of the first-order cyclic frequencies of the observations γ by any detector of cyclic frequencies and the constitution of an estimate $f_x^1$, of the set, $\Gamma_x^1$, of the cyclic frequencies γ.

The detection of the second-order cyclic frequencies of the observations, $\alpha_\epsilon$, for $\epsilon=-1$ and $\epsilon=+1$ by any detector of cyclic frequencies and the constitution of the estimates, $f_x^{[1,-1]}$ and $f_x^{[1,1]}$, of the sets respectively, $\Gamma_x^{[1,-1]}$ and $\Gamma_x^{[1,1]}$, of the cyclic frequencies respectively of the first and second matrices of correlation of the observations.

The estimation of the matrix $R_{\Delta x}(0)$ by $\hat{R}_{\Delta x}(0)(K)$ defined by (33) and (32) for l=0 from a given number of samples K.

The detection of the number of sources P from the decomposition of $\hat{R}_{\Delta x}(0)(K)$ into eigen elements. (All the non-deterministic sources are detected).

The computation of the whitening matrix of the observations, $\hat{T}$, where $\hat{T} \triangleq \hat{\Lambda}_s^{-1/2} \hat{U}_s^\dagger$, with a size (P×N), where $\hat{\Lambda}_s$ is the diagonal matrix (P×P) of the P greatest eigen values of $\hat{R}_{\Delta x}(0)(K) - \lambda\min I$, $\lambda\min$ is the minimum eigen value of $\hat{R}_{\Delta x}(0)(K)$ and $\hat{U}_s$ is the matrix of the associated eigen vectors. We write $z(t) \triangleq \hat{T} x(t)$. (The directional vectors of the non-deterministic sources are orthonormalized).

Identification Step

The choice of a triplet ($\alpha_m$, $\epsilon_m$, $l_{mq}$)

The estimation of the matrix of second-order cyclic cumulants of the whitened observations, $R_{\Delta z \epsilon_m}^{\alpha_m}(l_{mq} T_e)$, by $\hat{R}_{\Delta z \epsilon_m}^{\alpha_m}(l_{mq} T_e)(K)$ defined by (31), (29), (32).

The computation of a unit matrix $\hat{U}_{(\alpha m, \epsilon m)} = [e_1 \ldots e_{p'}]$ where $(P_{(\alpha m, \epsilon m)} \leq P)$ corresponds to the number of non-zero eigen values of $\hat{R}_{\Delta z \epsilon_m}^{\alpha_m}(l_{mq} T_e)(K)$ and $e_k$ (1≤k≤P') are the eigen vectors of $\hat{R}_{\Delta z \epsilon_m}^{\alpha_m}(l_{mq} T_e)(K)$ associated with the $P_{(\alpha m, \epsilon m)}$ highest eigen values.

The choice of the set $(\alpha_m, \zeta_m, l_{m1}T_e, l_{m2}T_e, l_{m3}T_e)$.

The reduction of dimension: $v(t) \triangleq \hat{U}_{(\alpha m, \epsilon m)}^\dagger z(t)$ is written, with a dimension $(P_{(\alpha m, \epsilon m)} \times 1)$ and a computation is made of the estimate of the cyclic quadricovariance $$\hat{Q}_{v\zeta m}^{\alpha_m}(l_{m1}T_e, l_{m2}T_e, l_{m3}T_e)(K)$$

of v(t) from $$\hat{Q}_{v\zeta m}^{\alpha_m}(l_{m1}T_e, l_{m2}T_e, l_{m3}T_e)(K)$$

and from $\hat{U}_{(\alpha m, \zeta m)}$.

The decomposition into eigen elements of $$\hat{Q}_{v\zeta m}^{\alpha_m}(l_{m1}T_e, l_{m2}T_e, l_{m3}T_e)(K)$$

and the estimation of the $P_{(\alpha m, \epsilon m)}$ eigen matrices $M_{vi}$ ($1 \leq i \leq P_{(\alpha m, \epsilon m)}$) associated with the $P_{(\alpha m, \epsilon m)}$ eigen values with higher-value moduli.

The joint diagonalization of the $P_{(\alpha m, \epsilon m)}$ eigen matrices $M_{vi}M_{vi}^\dagger$ weighted by the associated eigen values and the obtaining of the matrix of the directional vectors of the doubly whitened non-deterministic sources associated with the set $(\alpha_m, \zeta_m, l_{m1}, l_{m2}, l_3)$: $\hat{A}_{nd(\alpha m, \zeta m)}'$ Filter The computation of an estimate of the matrix of the directional vectors of the non-deterministic sources associated with the pair $(\alpha_m, \zeta_m)$: $\hat{A}_{nd(\alpha m, \zeta m)} = \hat{U}_s \hat{\Lambda}_s^{1/2} \hat{U}_{(\alpha m, \epsilon m)} \hat{A}_{nd(\alpha m, \epsilon m)}'$ The concatenation of the matrices $\hat{A}_{nd(\alpha m, \zeta m)}$ for all the pairs $(\alpha_m, \zeta_m)$, ($1 \leq m \leq M$). The matrix (N×P) $\hat{A}_{nd}$ of the directional vectors of the non-deterministic sources is obtained.

The extraction of the non-deterministic sources by any spatial filtering whatsoever of the observations constructed on the basis of $\hat{A}_{nd}$.

Processing of the Deterministic Sources

The construction of the orthogonal projector on the space orthogonal to the columns of $\hat{A}_{nd}$:

$$\hat{A}_{nd}: Proj = I - \hat{A}_{nd}[\hat{A}_{nd}^\dagger \hat{A}_{nd}]^{-1} \hat{A}_{nd}^\dagger$$

The implementation of the algorithm JADE [4] from the observations $w(t) \triangleq Proj \, x(t)$ to identify the directional vectors of the deterministic sources and extract these sources.

Exemplary Simulation of the Method According to the Invention with the Separator F3'

Figure 6A:
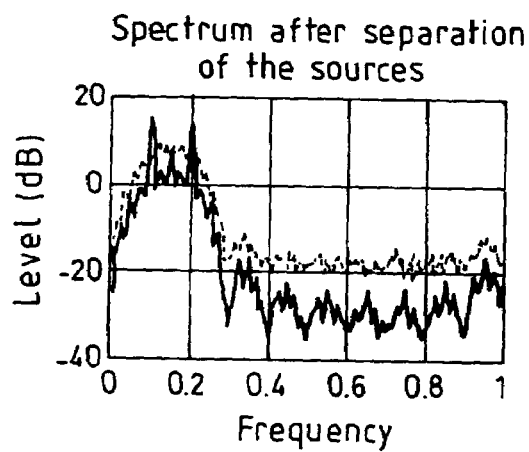
FIGS. 6A and 6B show results of separation using a classic estimator or an estimator according to the invention.
Figure 6B:
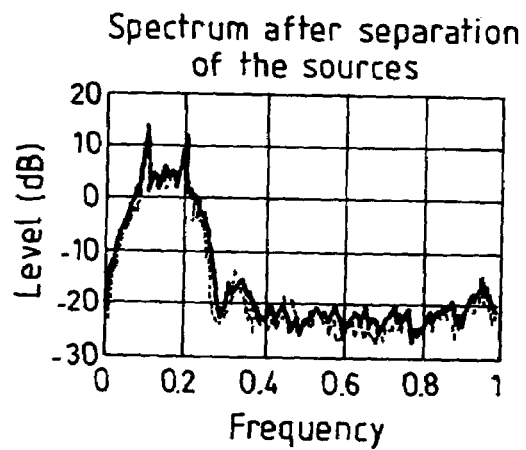

FIGS. 6A and 6B respectively give a view, in a level graph expressed in dB, for two non-centered cyclostationary sources with a direction ($\downarrow_1 = 50°$ and $\downarrow_2 = 60°$), of the spectrum level after separation of the sources (in using the method JADE bringing into play the set of first-order cyclic frequencies and the two sets of second-order cyclic frequencies) and of the channel formation, after separation of the sources by using the classic estimator (FIG. 6A) and by using the proposed estimator (FIG. 6B).

It can be seen that, with the empirical estimator, the separation works badly because a source is localized at $\downarrow = 55°$ while the sources have angles of incidence of $\downarrow_1 = 50°$ and $\downarrow_2 = 60°$. However, with the proposed estimator, the two sources are localized at 50° and 60° because the channel formation method on the first identified vector finds a maximum at 49.8° and, on the second vector, it finds a maximum at 60.1°. The signal-to-noise+interference ratios at output of filtering of the two sources are summarized in the following table:

|  | Source at $\theta_1 = 50°$ | Source at $\theta_2 = 60°$ |
|---|---|---|
| Empirical estimators $R_{xa}$ and $Q_{xa}$ | $SNIR_1 = 15.3$ dB | $SNIR_2 = 7.35$ dB |
| Proposed estimators $R_x$ and $Q_x$ | $SNIR_1 = 22$ dB | $SNIR_2 = 22$ dB |

In the following simulation, the proposed estimator is known as an exhaustive estimator. This example keeps the same signal configuration as earlier when the two sources nevertheless have a signal-to-noise ratio of 10 dB. The classic empirical estimator is therefore compared with the exhaustive estimator. The SNIR in dB of the first source is therefore plotted as a function of the number of samples K.

Figure 7:
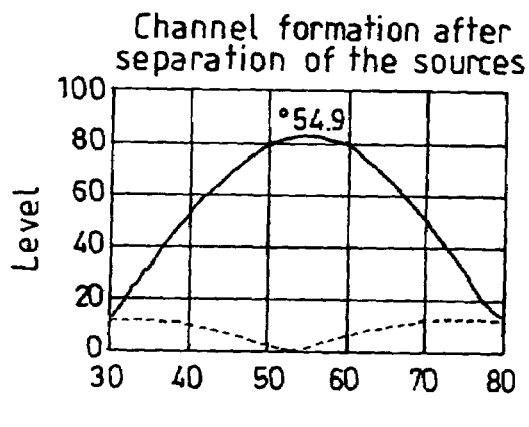
FIG. 7 shows the convergence of the estimator.
Figure 7:
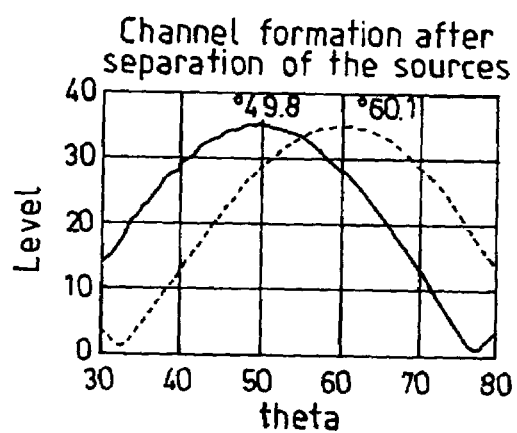
Figure 7:
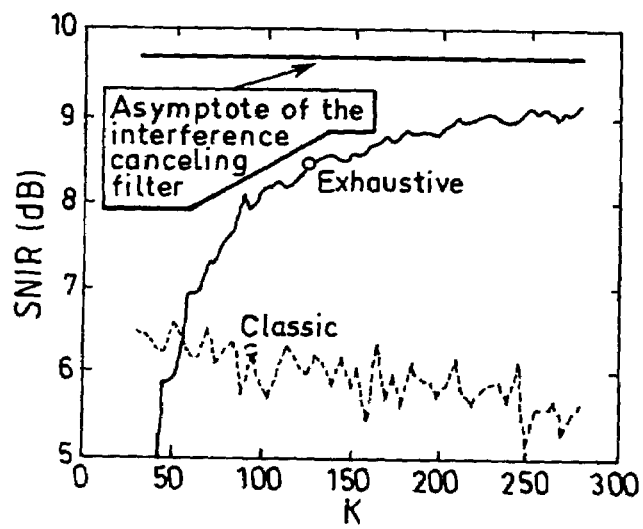

FIG. 7 shows that the exhaustive estimator converges on the asymptote of the optimum interference canceling filter when $K \to +\infty$ and that the classic estimator is biased in converging on an SNIR (signal-to-noise+interference ratio) of 5 dB at output of filtering.

Separators F4'

The separators of the family F4' are fourth-order self-learning separators implementing the following operations:

The detection of the first-order cyclic frequencies of the observations γ by any detector whatsoever of cyclic frequencies and the constitution of an estimate $$\hat{\Gamma}_x^1,$$

of the set, $$\Gamma_x^1,$$

of the cyclic frequencies γ. The estimation of $$\hat{\Gamma}_x^1,$$

can be done as in F1'.

The detection of the second-order cyclic frequencies of the observations, $\alpha_\epsilon$, for $\epsilon = -1$ and $\epsilon = +1$ by any detector whatsoever of cyclic frequencies and the constitution of the estimates, $$\hat{\Gamma}_x^{[1,-1]} \text{ and } \hat{\Gamma}_x^{[1,1]},$$

of the sets respectively, $$\Gamma_x^{[1,-1]} \text{ and } \hat{\Gamma}_x^{[1,1]},$$

of the cyclic frequencies respectively of the first and second matrices of correlation of the observations.

The estimation of the matrix $R_{\Delta x}(0)$ by $\hat{R}_{\Delta x}(0)(K)$ defined by (53) and (52) for l=0 from a given number of samples K.

The detection of the number of sources P from the decomposition of $\hat{R}_{\Delta x}(0)(K)$ into eigen elements. (All the non-deterministic sources are detected).

The computation of the whitening matrix of the observations, $\hat{T}$, where $\hat{T} \triangleq \hat{\Lambda}_s^{-1/2} \hat{U}_s^\dagger$, with a size (P×N), where $\hat{\Lambda}_s$ is the diagonal matrix (P×P) of the P greatest eigen values of $\hat{R}_{\Delta x}(0)(K) - \lambda\min I$, $\lambda\min$ is the minimum eigen value of $\hat{R}_{\Delta x}(0)(K)$ and $\hat{U}_s$ is the matrix of the associated eigen vectors. We write $z(t) \triangleq \hat{T} x(t)$. (The directional vectors of the non-deterministic sources are orthonormalized).

The choice of a triplet $(\alpha_m, \epsilon_m, l_{mq})$

The estimation of the matrix of second-order cyclic cumulants of the whitened observations, $$R_{\Delta z \epsilon_m}^{\alpha_m}(l_{mq} T_e), \text{ by } \hat{R}_{\Delta z \epsilon_m}^{\alpha_m}(l_{mq} T_e)(K)$$

defined by (31), (29), (32).

The computation of a unit matrix $$\hat{U}_{(\alpha m, \epsilon m)} = [e_1 \cdots e_{p'}] \text{ where } (P_{(\alpha m, \epsilon m)} \leq P)$$

corresponds to the number of non-zero eigen values of $$\hat{R}_{\Delta z \epsilon, m}^{\alpha_m}(l_{mq} T_e)(K)$$

and $e_k$ ($1 \leq k \leq P_{(\alpha m, \epsilon m)}$) are the eigen vectors of $$\hat{R}_{\Delta z \epsilon, m}^{\alpha_m}(l_{mq} T_e)(K)$$

associated with the $P_{(\alpha m, \epsilon m)}$ higher eigen values.

The reduction of dimension: $v(t) \triangleq \hat{U}_{(\alpha m, \epsilon m)}^\dagger z(t)$ is written with a dimension $(P_{(\alpha m, \epsilon m)} \times 1)$ and a computation is made of the estimate of the cyclic quadricovariance $$\hat{Q}_{v\zeta m}^{\alpha_m}(l_{m1} T_e, l_{m2} T_e, l_{m3} T_e)(K) \text{ of } v(t)$$

from $$\hat{Q}_{v\zeta m}^{\alpha_m}(l_{m1} T_e, l_{m2} T_e, l_{m3} T_e)(K) \text{ and from } \hat{U}_{(\alpha m, \zeta m)}.$$

The choice of a set $(\alpha_m, \zeta_m, l_{m1}, l_{m2}, l_{m3})$ $(1 \leq m \leq M)$ such that, for each of these pairs, at least one source possesses the fourth-order cyclic frequency $\alpha_m$ for a quadricovariance indexed by $\zeta_m$ and $(l_{m1} T_e, l_{m2} T_e, l_{m3} T_e)$, The set of these values is chosen, for example, so that there is compatibility with the parameters of the second-order cumulants $(\alpha_m, \epsilon_m, l_{mq})$ For each set $(\alpha_m, \zeta_m, l_{m1}, l_{m2}, l_{m3})$ $(1 \leq m \leq M)$ The estimation of the cyclic quadricovariance, $$\hat{Q}_{v\zeta m}^{\alpha_m}(l_{m1} T_e, l_{m2} T_e, l_{m3} T_e),$$

of the vector v(t). We obtain $$\hat{Q}_{v\zeta m}^{\alpha_m}(l_{m1} T_e, l_{m2} T_e, l_{m3} T_e)(K).$$

The decomposition into eigen elements of $$\hat{Q}_{v\zeta m}^{\alpha_m}(l_{m1} T_e, l_{m2} T_e, l_{m3} T_e)(K)$$

and the estimation of the $P_{(\alpha m, \epsilon m)}$ eigen matrices $M_{vi}$ ($1 \leq i \leq P_{(\alpha m, \epsilon m)}$) associated with the $P_{(\alpha m, \epsilon m)}$ eigen values with higher-value moduli.

The joint diagonalization of the $P_{(\alpha m, \epsilon m)}$ eigen matrices $M_{vi} M_{vi}^\dagger$ weighted by the associated eigen values and the obtaining of the matrix of the directional vectors of the doubly whitened non-deterministic sources associated with the set $(\alpha_m, \zeta_m, l_{m1}, l_{m2}, l_{m3})$: $\hat{A}_{nd(\alpha m, \zeta m)}'$ The computation of an estimate of the matrix of the directional vectors of the non-deterministic sources associated with the pair $(\alpha_m, \zeta_m)$: $\hat{A}_{nd(\alpha m, \zeta m)} = \hat{U}_s \hat{\Lambda}_s^{1/2} \hat{U}_{(\alpha m, \epsilon m)} \hat{A}_{nd(\alpha m, \epsilon m)}'$ The concatenation of the matrices $\hat{A}_{nd(\alpha m, \zeta m)}$ for all the pairs $(\alpha_m, \zeta_m)$, ($1 \leq m \leq M$). The matrix (N×P) $\hat{A}_{nd}$ of the directional vectors of the non-deterministic sources is obtained.

The extraction of the non-deterministic sources by any spatial filtering whatsoever of the observations constructed on the basis of $\hat{A}_{nd}$.

The construction of the orthogonal projector on the space orthogonal to the columns of $\hat{A}_{nd}$: Proj=I–$\hat{A}_{nd}$ $[\hat{A}_{nd}^\dagger \hat{A}_{nd}]^{-1} \hat{A}_{nd}^\dagger$ The implementation of the algorithm JADE [4] from the observations $w(t) \triangleq$ Proj $x(t)$ to identify the directional vectors of the deterministic sources and extract them.

Figure 8:
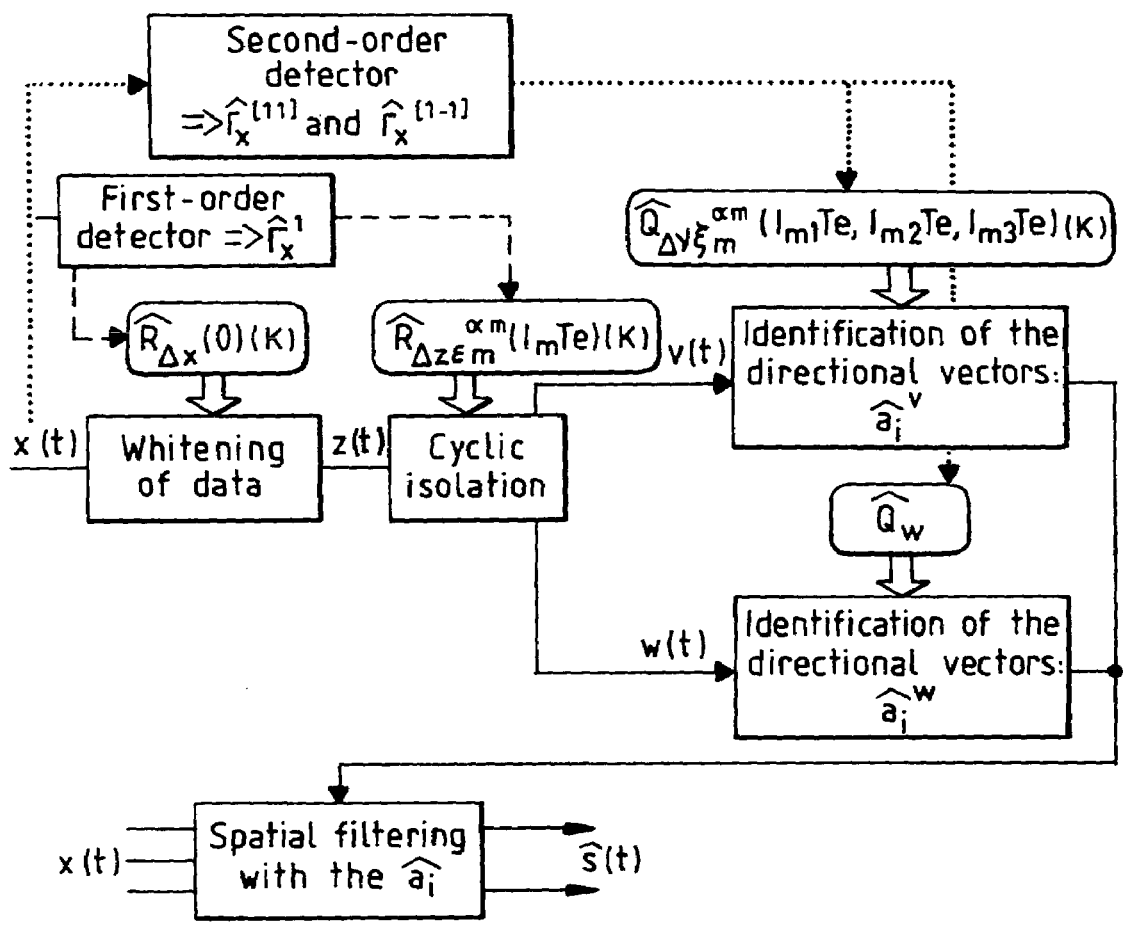
FIG. 8 is a drawing of the steps implemented according to the invention for the cyclic JADE method.

The implementation is summarized in FIG. 8 for M=1 (only one set $(\alpha_m, \zeta_m, l_{m1}, l_{m2}, l_{m3})$ is used).

The steps of the method according to the invention described here above are applied especially in the above-mentioned separation techniques, namely the SOBI, cyclic SOBI, JADE and cyclic JADE techniques.

Without departing from the scope of the invention, the steps of the method described here above are used, for example, to carry out the angular localization or goniometry of signals received at the level of a receiver.

For classic angular localization, the method uses for example:
- MUSIC type methods described in the reference [10] of R. O Schmidt with the matrix of covariance: $\hat{R}_{Ax}(0)(K)$
- Cyclic goniometry type methods given in the reference [11] by W. A. Gardner with the matrix of cyclic covariance: $R_{Ax\epsilon}, {}^{\alpha m}_m(1_{mq}T_e)$
- Fourth-order goniometry methods described in the reference [12] by P. Chevalier, A. Ferreol, J P. Denis with the quadricovariance: $\hat{Q}_{x\zeta}, {}^{0}_{m}(0,0,0)(K)$
- Methods of fourth-order cyclic goniometry with the cyclic quadricovariance $$\hat{Q}^{\alpha m}_{x\zeta m}(l_{m1}T_e, l_{m2}T_e, l_{m3}T_e)(K)$$

Bibliography

[1] C. JUTTEN, J. HERAULT, <<Blind separation of sources, Part I: An adaptive algorithm based on neuromimetic architecture>>, *Signal Processing*, Elsevier, Vol 24, pp 1-10, 1991.

[2] P. COMON, P. CHEVALIER, <<Blind source separation: Models, Concepts, Algorithms and Performance>>, Chapter 5 of the book *Unsupervised adaptive filtering—Tome 1—Blind Source Separation*, pp. 191-235, Dir. S. Haykins, Wiley, 445 p, 2000.

[3] A. BELOUCHRANI, K. ABED-MERAIM, J. F. CARDOSO, E. MOULINES, <<A blind source separation technique using second-order statistics>>, *IEEE Tran. Signal Processing*, Vol. 45, N°. 2, pp 434-444, February 1997.

[4] J. F. CARDOSO, A. SOULOUMIAC, <<Blind beamforming for non-Gaussian signals>>, *IEEE Proceedings-F*, Vol. 140, N°6, pp 362-370, December 1993.

[5] A. FERREOL, P. CHEVALIER, <<On the behavior of current second and higher order blind source separation methods for cyclostationary sources>>, *IEEE Trans. Signal Processing*, Vol 48, N°6, pp. 1712-1725, June 2000.

[6] K. ABED-MERAIM, Y. XIANG, J. H. MANTON, Y. HUA, <<Blind source separation using second-order cyclostationary statistics>>, *IEEE Trans. Signal Processing*, Vol. 49, N°4, pp 694-701, April 2001.

[7] P. CHEVALIER, <<Optimal separation of independent narrow-band sources—Concept and Performance>>, *Signal Processing*, Elsevier, Special issue on Blind Source Separation and Multichannel Deconvolution, Vol 73, N°1-2, pp. 27-47, February 1999.

[8] A. FERREOL, P. CHEVALIER, <<Higher Order Blind Source Separation using the Cyclostationarity Property of the Signals>>, *ICASSP*, Munich (Germany), pp 4061-4064, April 1997.

[9] SV SCHELL and W. GARDNER, "Detection of the number of cyclostationnary signals in unknown interference and noise", Proc of Asilonan conf on signal, systems and computers 5-7 November 90.

[10] R. O Schmidt, A signal subspace approach to multiple emitters location and spectral estimation, PhD Thesis, Stanford University, CA, November 1981.

[11] W. A. Gardner, "Simplification of MUSIC and ESPRIT by exploitation cyclostationarity", Proc. IEEE, Vol. 76 No. 7, July 1988.

[12] P. Chevalier, A. Ferreol, J P. Denis, "New geometrical results about 4-th order direction finding methods performances", EUSIPCO, Trieste, pp. 923-926, 1996.

What is claimed is:

1. An antenna processing method that enables separation or angular localization of cyclostationary signals, comprising:
receiving at an antenna with N sensors, a mixture of cyclostationary and cycloergodic signals from independent sources;
making at least one nth order estimator including:
generating an asymrtotically unbiased and consistent estimator of a cyclic correlation matrix for centered observations of cyclostationary and cycloergodic signals; and
generating an asymrtotically unbiased and consistent estimator of a cyclic covariance matrix for non-centered observations of cyclostationary and cycloergodic signals;
thereby allowing separation, or angular localization of the received signals using the at least one nth order estimator.

2. The method according to claim 1, comprising a step for separating emitter sources of the signals received by using the at least one estimator.

3. The method according to claim 2 wherein the at least one estimator is a second-order estimator.

4. The method according to claim 2 wherein the at least one estimator is a fourth-order estimator.

5. The method according to claim 2 wherein the cyclic frequencies are detected first-order or second-order frequencies.

6. The method of separating non-centered cyclostationary sources, according to claim 1, further comprising
separating the signals using at least one of SSOBI, cyclic SOBI, JADE, and cyclic JADE separation techniques.

* * * * *